United States Patent [19]

Headrick

[11] Patent Number: 4,594,470
[45] Date of Patent: Jun. 10, 1986

[54] SOLAR GENERATOR MOUNTING STRUCTURE

[76] Inventor: Richard T. Headrick, 5200 Irvine Blvd., Space #24, Irvine, Calif. 92715

[21] Appl. No.: 612,797

[22] Filed: May 22, 1984

Related U.S. Application Data

[63] Continuation-in-part of Ser. No. 527,164, Aug. 26, 1983, abandoned.

[51] Int. Cl.⁴ .............................................. H01L 31/04
[52] U.S. Cl. ................................. 136/246; 250/203 R; 353/3; 126/424; 126/425; 52/81; 52/82; 52/182
[58] Field of Search ..................... 136/246; 250/203 R; 353/3; 126/424, 425; 52/81–82, 182

[56] References Cited

U.S. PATENT DOCUMENTS

| | | | |
|---|---|---|---|
| 2,993,125 | 7/1981 | Geer et al. | 250/215 |
| 4,172,739 | 10/1979 | Tassen | 136/246 |
| 4,223,174 | 9/1980 | Moeller | 136/246 |
| 4,233,958 | 11/1980 | Heden | 126/424 |
| 4,236,937 | 12/1980 | Wihl | 136/246 |
| 4,283,887 | 8/1981 | Horton et al. | 52/2 |
| 4,296,731 | 10/1981 | Cluff | 126/424 |
| 4,361,758 | 11/1982 | Rotolo | 250/203 R |
| 4,395,581 | 7/1983 | Girard | 136/246 |
| 4,398,053 | 8/1983 | Orillion | 136/248 |

*Primary Examiner*—Aaron Weisstuch
*Attorney, Agent, or Firm*—Jackson & Jones

[57] ABSTRACT

A solar generator support structure mounting standard photovoltaic panels thereon is disclosed. The solar panels are housed in flat planes (bays and courses) which include a plurality of parallel, symmetrically faceted and stepped areas that are a maximum at the base and over the center of the support structure and which planes define a dome-shaped segment called a hemidome. The planes face upwardly and are stepped, ramped (or a combination thereof) with respect to each other. Single or double axis tracking is provided so that the sun's movement is followed.

39 Claims, 18 Drawing Figures

SOLAR GENERATOR MOUNTING STRUCTURE

This application is a continuation-in-part of the now abandoned application by the same inventor, having Ser. No. 527,164 filed on Aug. 26, 1983 and entitled IMPROVED SOLAR GENERATOR MOUNTING STRUCTURE.

BACKGROUND OF THE INVENTION

1. Origin of the Invention

This invention was originated by a sole inventor in response to a perceived need for improvements in the field of solar energy generation.

2. Field of the Invention

This invention relates to an improved mounting and support structure for housing state-of-the-art solar, or photovoltaic ("PV"), panels. In particular it relates to a segment of a dome-shaped support (which I sometimes herein call a hemidome) that has flat upwardly-facing PV panels positioned at a compromise sun angle. Rotation of the support in one axis about the vertical center of the hemidome, so it follows the sun's movement, yields high efficiency in solar energy generation. Certain embodiments of my invention include design steps which reduce the effect of early morning or late afternoon shading of some of the PV panels. Indeed, in certain preferred embodiments of this invention, the steps are eliminated entirely and a ramp configuration is used to support the PV panels.

Background Discussion

Harnessing the sun's rays by using solar cells to generate electrical power is today well known. A summary of several known photovoltaic facilities is published in the April 1982 Volume 2, No. 2, of *ARCO Solar News*. As there described, billboard-like arrays are common to the prior art.

One key to efficiency is to achieve maximum "packing density" at lowest acreage cost with minimum transmission facilities and line distance being required. In an effort to achieve that goal, various mounting techniques have been utilized with varying degrees of success. These mounting techniques include fixed position mounts or moveable mounts which provide controlled movement in one or two axes with calendar correction for the sun's apparent movement during the seasons when viewed from a fixed and given point on earth.

In the prior art, a fixed mounting is cheapest, but it is least efficient at absorbing sunlight. The moveable mounting techniques increase solar efficiency but do so only by paying the price of more costly and sophisticated rotatable structures and solar tracking systems. Prevention from wind damage must be made in either type of prior art mounting structure.

Turning first to a fixed position billboard type of array, the above-noted reference discusses homes that mount conventional PV panels on the roof of the home. These panels can be secured very firmly. Once secured, they will resist most wind damage. Being fixed in place, however, their efficiency in capturing solar energy is far lower than moveable structures.

A pyramid shape is considered as a fixed structure in the prior art. The east, south, and west sides of the pyramid are sloped up at the proper angle. This also, however, has definite limits in efficiency. One problem with the pyramid configuration, for example, is that it has three efficiency peaks. It is thus erratic in the power it generates. One peak is towards the east in the morning, another is toward the west until sunset, and in between, a third peak (probably representing something in the order of two thirds of its total energy output) is when the south facing side of the pyramid catches most of the sunlight. In between each of these energy peaks is a sharp drop-off in energy output. The energy output is minimum at both 45° azimuth angles, but additionally has associated lowered energy efficiencies in the proximity of these azimuth angles.

If the entire pyramid were capable of rotating to follow the sun-azimuth, it would be more efficient. In such event the east and west sides of such a rotating structure would not serve much purpose other than accumulation of ambient light and their contribution to its overall structure integrity. Rotation of such a pyramid structure to follow the movement of the sun, however, would entail a highly impractical mechanical/electrical system.

The pyramid structure can resist most winds. Even though fixed and rigid, the solar cell panels can be torn loose if strong winds come from just the wrong direction. Any attempt to make mechanical provision for moving PV panels into a safe position in high winds would be very difficult. This difficulty represents another disadvantage of the pyramid proposal.

Other prior art disclosed in the above-cited reference includes moveable flat panel arrays. For example, at the demonstration facility near Hesperia, California, sixty (60) kilowatts per acre is being produced by ARCO-Solar, Inc., in cooperation with Southern California Edison.

The Hesperia arrays are rectangular in shape so that they may be readily assembled using unit groupings already mass manufactured by ARCO-Solar, Inc. and others. Because of shading, only six towers may be located on one acre. Each tower yields a maximum wattage of about 10,000 watts per 1,000 square feet of array (10 KW), thus producing 60 KW per acre.

Packing density for installations similar to that of Hesperia is not a problem when the installation is made in a location sufficiently remote that the real estate is available at low cost. The remoteness, however, demands increased costly transmission facilities and the line distances pose power losses. Thus, there is a balance between being able to produce the electricity and being able to transmit it to more densely populated areas without prohibitive line costs.

Most manufacturers, including ARCO-Solar, Inc., have determined that there is a strong economic advantage in designing the array of photovoltaic modules in such a manner that they incorporate standard array groupings. A module, as I use it in this instance, is a 1-foot×4-foot photovoltaic cell. Operating efficiencies are increased if such modules are arranged into 8-foot×20-foot panels which would incorporate 40 each of the 1-foot×4-foot modules, or, in the alternative, 9-foot×16-foot panels, which would incorporate 36 each such modules. When these dimensions and modules are employed, the panels may be prewired prior to installation on my space frame structure. As I will describe further on in my invention, each module is arranged in horizontal rows from left to right with respect to a front view of the support structure. By prewiring the modules in series when any "shading" is effective, only one horizontal row of modules is shaded at a time. This minimizes the design losses which are caused by "shading."

The word "shading" as used herein refers to the fact that, as the sun comes up from the horizon, the sun causes shadows to fall due to the steps on certain of the faces. The shadows from those steps fall on the next upward array. Since some manufacturers have determined that a certain percentage of shading causes the entire PV panel to become inefficient, those panels by certain manufacturers automatically drop out of the power-generating circuit when shaded. In accordance with certain preferred embodiments set forth in this application, the shading does not cause as much disadvantage as in other of my preferred embodiments. Furthermore, by utilizing certain geometric principles, shading can be substantially eliminated while still yielding efficient power generation.

SUMMARY OF THE INVENTION

My invention provides a segment of a dome-shaped support structure—a hemidome—which comprises a central truss starting at the base and extending radially over the apex of the hemidome's segment. On each side of the central truss I provide a plurality of parallel, symmetrically faceted and stepped flat planes which diminish in areas toward the top of the hemidome and toward the outer edges of the hemidome's diameter. Flat PV panels are mounted on those planes.

The flat planes of my stepped support structures face upwardly at a compromise sun angle. Beyond the apex of the hemidome I have arranged an additional upstanding row of flat planes for housing additional Pv areas and thus efficiency is increased. My support preferably employs single axis tracking by rotating about the hemidome's vertical axis at its apex to follow the sun's movements.

My solar generator comprises a substantially dome-shaped inner support structure. That inner support may be formed from rigid arches, thin-walled concrete, reinforced aluminum, or any other such suitable inner support structure. An outer substantially dome-shaped segment is spaced from and is rotatable about the inner support. The segment generically provides a plurality of flat planes which house PV arrays responsive to the sun's rays for generating electricity. I have disclosed and claimed several alternative embodiments representative of my invention. For example, the flat planes are parallel to each other and are of rectangular shape with their planar surfaces facing the compromise sun angle, which sun angle in turn is related to the latitude location where my solar generator is positioned. The plurality of flat planes include a first group facing that sun angle and located near the base of the outer segment. The plurality of flat planes also include a second and additional stepped groups, with the second group located above and behind the first and the other groups progressively situated above and behind adjacent groups and all groups facing said compromise sun angle. Right angle steps are provided between adjacent array planes. In one embodiment of my invention, I have noted that the right angles for very low sun angles will cause shading on a portion of the next upper array plane. In another embodiment, I have structurally relieved the right angle steps to diminish the effect of shading. I have also electrically relieved the shading problem by a novel wiring approach described in more detail hereinafter. In other embodiments the first group of flat planes near the base of the dome-shaped segment are faced at the compromise sun angle but the other groups are ramped from the top of the first group without any steps which may cause shading being employed at the higher groups.

To increase efficiency it is known in the prior art, such as that at Hesperia, to use double axis tracking which permits continual orientation of the solar arrays toward the sun's position. The tracking takes place throughout the day and takes into account the seasonal changes of the sun's position on a day-by-day basis. Double axis tracking is well known. Such tracking is controlled either by a computer or sometimes by optical means. The billborads are mounted on a computer-controlled rotating rocker which in turn sits on a single post or pylon. An acre has over 43,500 square feet. The 6,000 square feet of a billboard-type array is roughly 13% of an acre. Additionally, the Hesperia system has the capability of the entire array being "slewed" horizontally in case of a high wind.

I have discovered from an in-depth review of computer analysis of sun-angles that at 36° N. Lat., a 50° up angle above the horizon is a very efficient compromise. The compromise sun angle under circumstances I describe in my invention, diminishes the need for double axis tracking. While I do not exclude double axis tracking from my invention, I have achieved a very high degree of solar efficiency by single axis tracking.

The present invention provides a moveable array that has the capability of either single or double axis tracking. The support structure is shaped as essentially one-half of a dome which has symmetrically faceted and stepped flat faces in parallel planes. These faces diminish in area from the middle of the hemidome in two dimensions, e.g., toward the outer edges of the hemidome's diameter ("facets") and toward and over the top of the hemidome's apex ("steps"). The flat panels are tilted at the proper compromise sun elevation which is known for a given erection site. To give a representative example at 36° N. Lat., it is advantageous to face the flat panels directly at the sun's compromise position of up 50°. Although the sun's position does vary during the seasons, this sun position is a particularly meritorious compromise. My computer studies have recognized this elevation to be a high efficiency compromise for a particular latitude position. The compromise angle, of course, varies with latitude. For each degree of latitude less than 36° north, 1° of sun angle elevation is added to the 50° up angle. Thus, at 35° north, the compromise sun angle is 51° up. For each degree of latitude greater, e.g., further north, then 1° is subtracted. Accordingly at 37° north the array tilt angle is 49°.

My support structure for the flat solar panels is referred to as a hemidome because it has a plurality of arc-like trusses that define essentially a portion of a rounded half-dome when the trusses are assembled. The support includes three major centrally located trusses. The middle truss of the three starts at the hemidome's base point and curves upwardly and over the apex, or highest point, of the dome surface. It terminates at a point located about 30° to 40° over the apex of the hemidome, where I advantageously mount an upwardly extending extra plurality of solar panels for still further solar efficiency.

My major central truss defines a dividing line for a symmetrical group of rectangular panels that are located on either side of the major truss and which terminate at the two outside trusses of these three centrally located ones. Since these three main trusses tend to be thinner I have found it advantageous to obtain additional support strength by having the flat tangential portions of the bays at the base of the hemidome recessed within an externally exposed arc segment of these three main trusses.

Before describing the support structure further it is deemed important to note a feature of this invention that demonstrates its unique concept. Computer studies have shown that the sun's movements can be followed very accurately during each given day throughout the seasons of the year. Such a movement requires double axis tracking. Simply stated, the arrays must face east at precisely the correct direction each morning and follow the sun until it sets in the west in the evening. My dome-shaped undersupport includes a series of circular rails concentrically located about the center of the hemidome's axis. Wheels located on the inside of my rotating support structure carry the trusses and the arrays. A drive mechanism rotates the support structure to precisely follow the sun's path from sunup to sundown. Following sundown, the structure continues its travel on around to the precise easterly direction where it arrives on time for the next morning's sunrise. Continuous movement is considered meritorious, when compared to reversing or reciprocal motion, because continuous movement may be achieved more simply than the other types.

My support structure is also highly resistant to wind damage. The rails, wheels and motor drive may be adapted to respond to a known high-wind indicator device by rapidly moving the hemidome support structure so that the wind blows through the open spaces of the truss supports. The flow solar array panels then present an edge to the wind and will remain securely in place with relatively little chance of wind damage.

BRIEF DESCRIPTION OF THE DRAWINGS

The features of the present invention can best be understood by reference to the following description taken in conjunction with the drawing where like numerals indicate like parts.

Referring now to the figures.

DETAILED DESCRIPTION OF THE DRAWINGS

Figure 1:
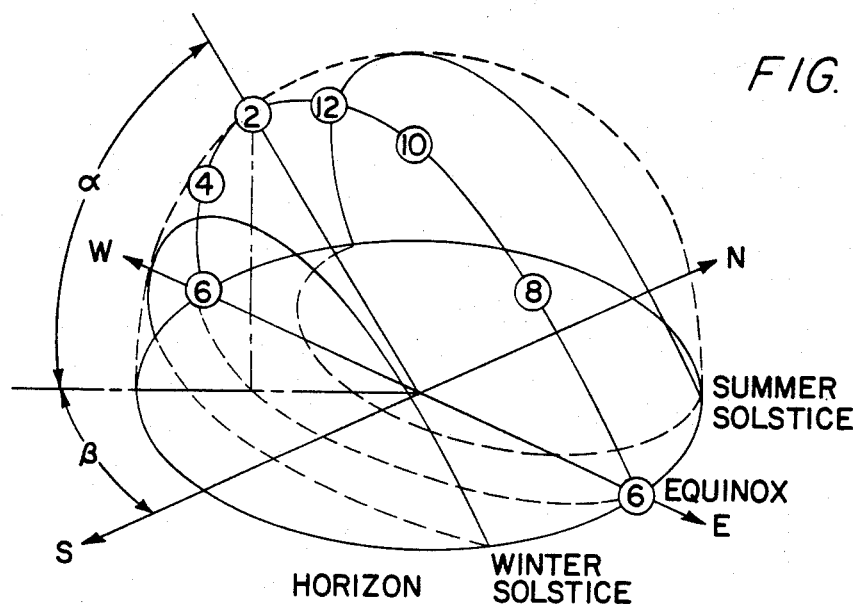
FIG. 1 is a drawing showing the sun's movement.

Turning now to FIG. 1 some typical sun movements are depicted. Solar tables are known and available which depict very precisely the sun's exact movement for every day. The most practical of numerous tables that are available reveal what are called sun path diagrams. The explanation of such a diagram, in general, is shown by FIG. 1.

FIG. 1 yields a graphic presentation of the sun's movement in the sky as projected onto a horizontal plane. In FIG. 1 the horizon is represented as a circle with an observation point at the center. The sun's position at any date and hour is shown in FIG. 1 by its altitude $\alpha$ and its bearing $\beta$.

As shown in FIG. 1, the hours of the day are positioned along the sun's path. In the northern hemisphere, the sun's arc is the highest overhead in the summer and is the lowest overhead in the winter. The highest and lowest arcs are called the summer solstice and the winter solstice. The average, or median, in between both curves is called the equinox. These three arcs are depicted and labeled in FIG. 1.

Table I shows the equinox elevation between sunup and sundown. The sun's hourly positions for Table I are depicted in circles in FIG. 1.

TABLE 1

| 6.00 A.M. | 8:00 | 10:00 | 12:00 | 2:00 | 4:00 | 6:00 P.M. |
|---|---|---|---|---|---|---|
| EAST 90° | 72°E | 44°E | SOUTH | 44°W | 72°W | WEST 90° |

Figure 2:
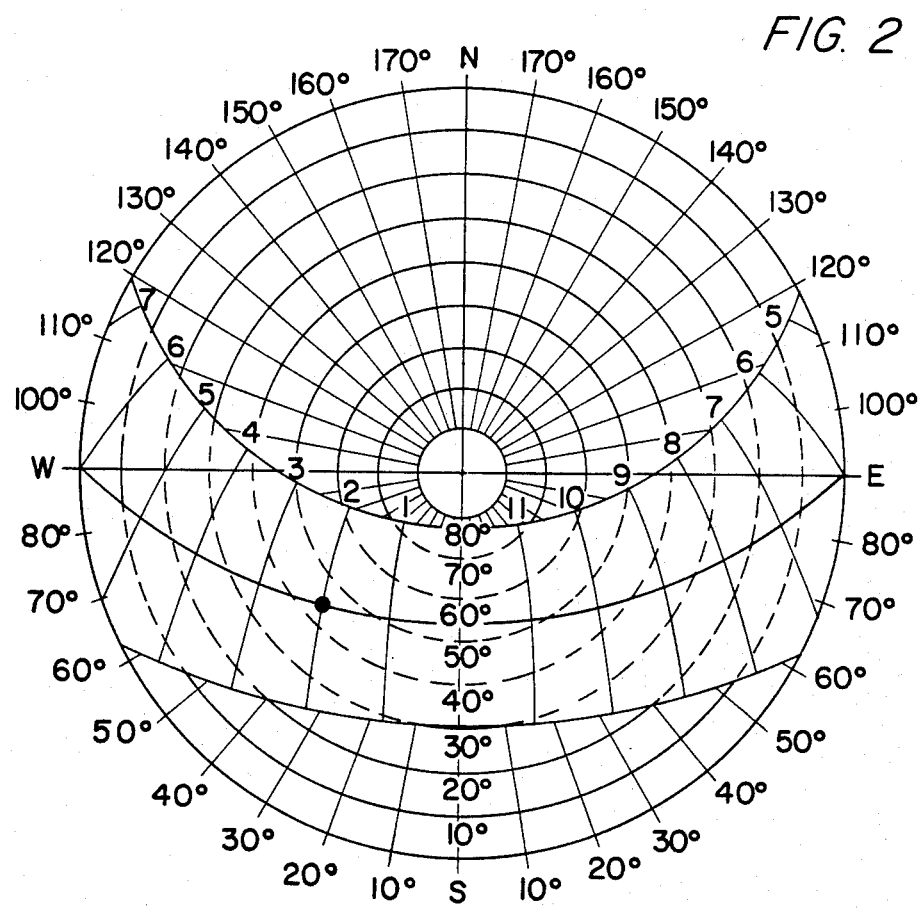
FIG. 2 is a graphic projection of the sun's movement when presented on a horizontal plane at the base location of FIG. 1.

In FIG. 1 a vertical line is drawn from 2:00 P.M. to the point where it intersects the horizontal plane. That vertical line defines $\alpha$ and $\beta$ as shown in FIG. 1. For the sun path diagram of Table 1, FIG. 2 shows that a series of concentric evenly spaced circles are used to depict altitude $\alpha$ with each circle being 10° in altitude or elevation. The bearing angle, $\beta$, of the sun at 2:00 P.M. is located by dividing the horizontal plane by a series of evenly spaced radii. In this example the vertical line of FIG. 1 intersects at about 44° west. That intersection is shown as a solid dot in FIG. 2. This 44° west position available from FIG. 2 is reflected in Table I at 2:00 P.M..

I have studied computerized tables for the sun's movement in sun path diagrams as shown in FIG. 2. The sun path diagrams, of course, vary for each latitude position. FIG. 2 depicts the sun path diagram for 36°N latitude. At every latitude position a highly efficient compromise sun angle is available. For example, in the 36°N latitude example a compromise sun position is 40° above the horizon.

Base upon the above-noted observation, I have designed my mounting structure to have, in one embodiment, a constant 50° up, or altitude, angle for single axis rotation about the highest point of my segmented dome structure. A single axis of rotation is highly preferable since it may be simply implemented. As shown by the perspective of FIG. 3, all of my rectangular solar panels face up at a constant angle of 50° from the horizon (that angle is proper for 36°N latitude).

Figure 3:
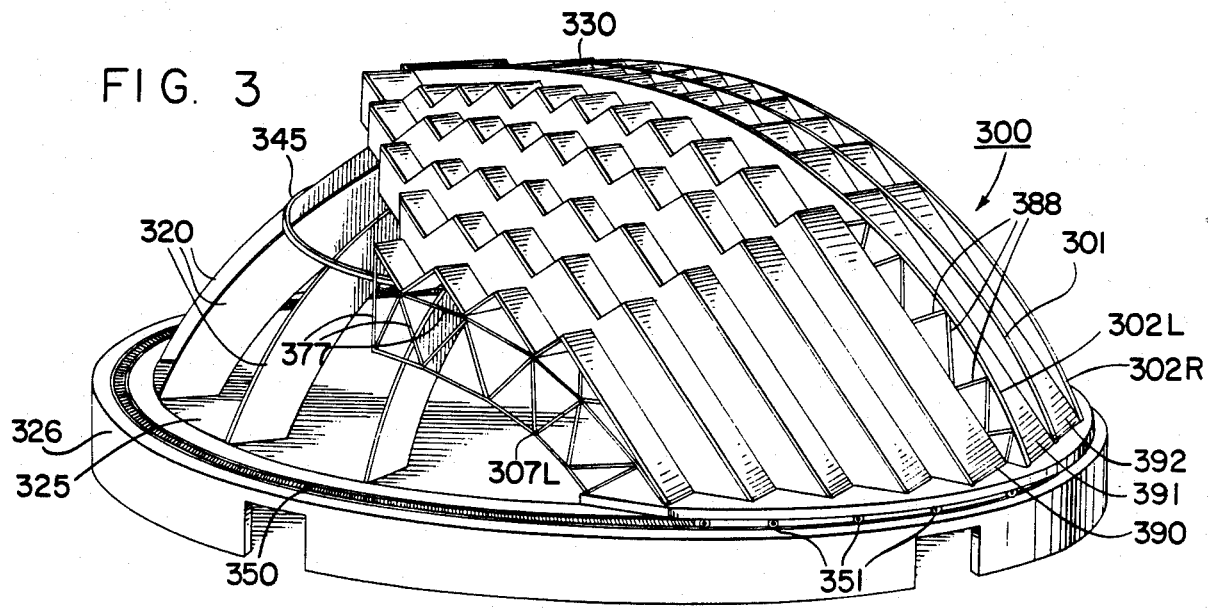
FIG. 3 is a perspective view of one embodiment of my support structure.

FIG. 3 in perspective shows, at the left-hand side, a series of spaced radial arches 320 that start at the base 325 and join together at the apex 330 (not visible in FIG. 3). The radial arches 320 support an intermediate circular track 345. Wheels mounted on the inside of my solar array structure 300 ride on track 345.

The main load-bearing rail system includes tracks 350 and wheels 351 which are located at the periphery of base 325 as shown in FIG. 3. This structure may either be at ground level or it may be elevated and supported at the top of the wall 326 also as there depicted. The elevated wall 326 provides unimpeded entrance and exit regardless of the location of the space frame 300.

A load-bearing pivot may also be provided at the apex of the dome-shaped arches 320 and is matched at the inner surface of the array frame 300. This pivot is preferably a "slip-plate" as used for bridge construction. These comprise two ground flat plates of heavy steel, heavily Teflon coated and with additional provision for occasional lubrication from a remote, ground level, location. The purpose is to accommodate any misalignments in the track systems 345 and 350 without causing binding at the pivot point. A screw-jack mechanism permits adjustment of the lower plate to carry a predetermined portion of the space frame load.

It should be noted that the radial arches 320 shown in FIG. 3 may, instead, be a dome monolithically constructed of concrete, aluminum, or any other suitably reinforced material. Although concrete domes are the ones mainly referred to hereinafter, I do not intend my invention to be so limited. Any dome structure will provide an enclosure which may be utilized to shelter the technical equipment involved in power storage, conversion from D.C. to A.C., and metering to the utility grid. Also, the space within a dome may serve a totally separate purpose such as a warehouse, airplane hangar, grain elevator, auditorium, etc.

Figure 10:
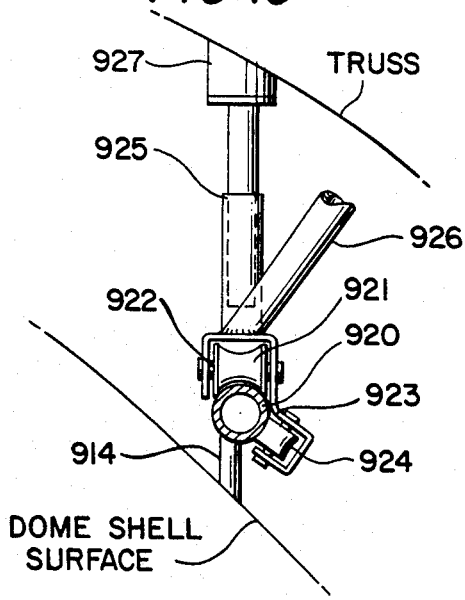
FIGS. 10 and 10a are respectively an end and a side view of a support wheel system for riding on the rails such as are depicted in FIG. 9.
Figure 10A:
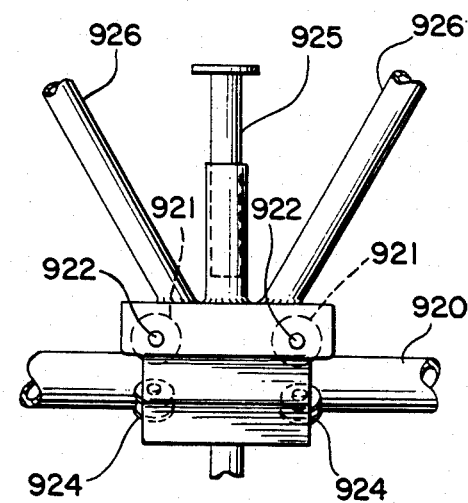
Figure 11:
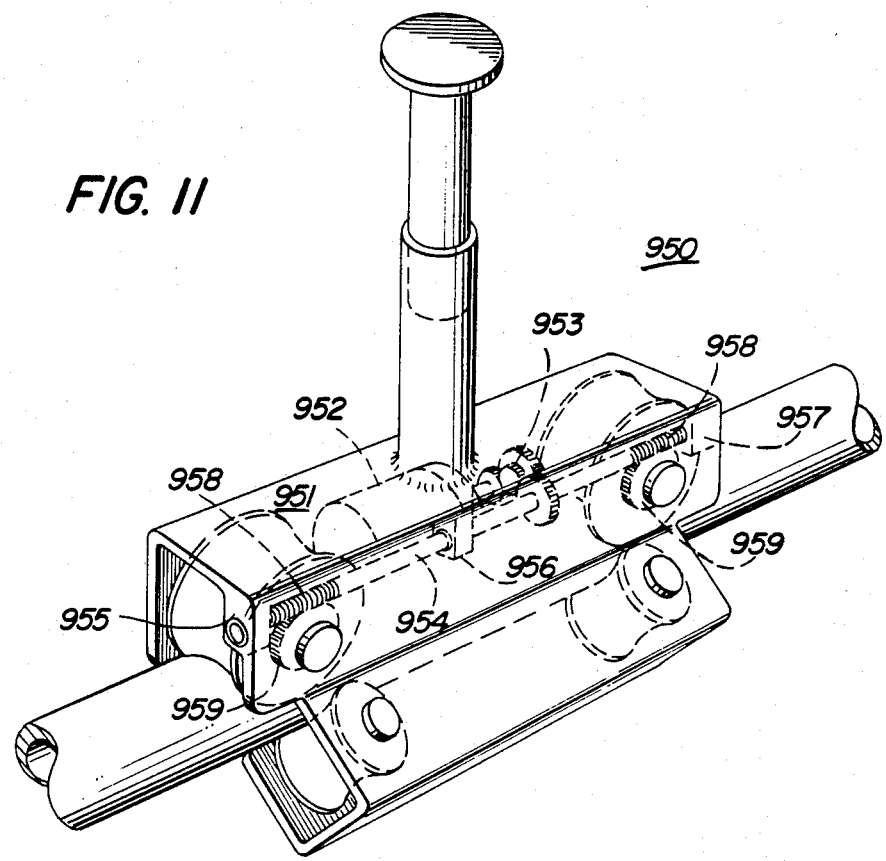
FIG. 11 is an internal perspective view of a wheel drive and support mechanism suitable for use in my invention.

My solar array structure 300, FIG. 3, is rotatably driven to follow the sun from morning to evening. The drive system may be any conventional system. A preferred drive system, however, will be described in more detail later in connection with FIGS. 7 through 7C. an alternative drive system eliminates the wheels at the base, as shown and described in connection with FIG. 3, and utilizes a combination wheel drive and a support wheel system such as are depicted in FIGS. 10, 10A and 11. Obviously, any combination of these and other conventionally-known support and drive systems are within the scope of my invention.

FIG. 3 is only a partial perspective. Only the truss 307L for supporting the solar array panels at the leftmost edge of array 300 is shown in full detail. Truss 307L has a series of straight tubular braces 377, which braces may advantageously be rectangular in cross-section. Obviously any suitable brace material, whether round or angular, could suffice for my braces. The straight brace sections 377 are mitered and are connected together by brackets, bolts, welding or the like (not shown).

Another truss 302L is shown in partial detail. Again, straight brace sections 388 are formed into rigid triangles to form this brace. Because my support structure is a hemidome the three main braces 301, 302L, and 302R are thinnest in the radial direction toward arches 320, due to their location being essentially tangential to those arches 320.

For added strength and rigidity I have extended the arc of these three trusses 301, 302L, and 302R above the support surfaces that house the flat solar panels shown as, for example, 390, 391, 392, etc.

For purposes of illustration only, assume that the perspective view of my stepped hemidome support has the dimensions stated herein. As a representative example, consider the arches 320 replaced by a thin-walled concrete, or similar type, dome structure that may be 200 feet in diameter at its base. Such a dome would cover 31,416 square feet. The concrete, aluminum, or other structural shell is 67 feet high with a radius of curvature of 108 feet. The dome's external surface area is 45,465 square feet. Since one acre is 43,560 square feet, the dome's outer surface area is 104% of one acre. Using my design guidelines, approximately one-half of the surface area of the dome using rectangular arrays each at a sun reciprocal angle of 40° is available for use as described in more detail with respect to FIG. 4.

Figure 4:
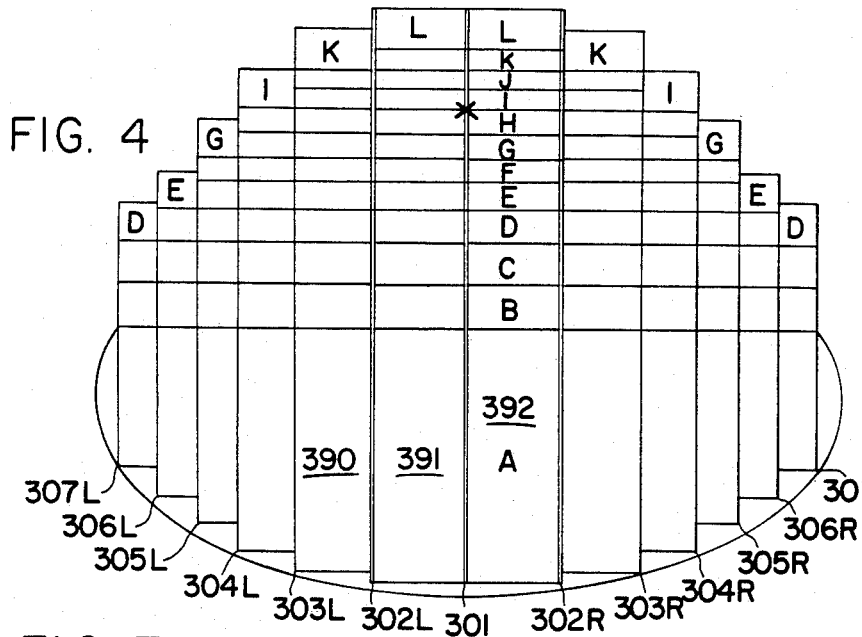
FIG. 4 is a view showing the parallel bays when viewed from a 40° compromise sun angle (reciprocal).

If one were at the compromise sun position and looked down on my solar array invention, it would yield the elliptical shaped area depicted in my FIG. 4. FIG. 4 shows what would be seen by one's eye if the panels were positioned at an up 50° location without any shading taking place on the PV panels and the line of sight were perpendicular to the faces of the panels. For simplicity purposes in FIG. 4 only the solar panels without any undersupports are depicted.

FIG. 4 thus represents the nonshaded area that would receive sunlight from a compromise sun angle with my support structure designed to rotate about a vertical drawn through the high point of my hemidome. It is important to understand from my FIG. 4 that a dome covering about three-quarters of an acre at its base 325, FIG. 3, exposes, in my hemidome 300, over 20,956 square feet of solar panel area. By reference again to the example in Hesperia, I have achieved a space efficiency by my solar array structure of essentially 48% as compared to approximately 13% of the prior art, for a factor of improvement of approximately 4.

FIG. 4 shows the total exposed aperture of solar area that is workable from sunup to sundown subject, of course, to some shading. Quite obviously, during the early morning at dawn there will be some shading of some of the surfaces near the top and the oversurface portion of the dome. However, even that shading diminishes rapidly as the sun rises above the horizon. The lowest tangential "course" near the base and facing the sun represents approximately 45% of the entire array aperture. The loss due to shading at 8:30 A.M. is approximately 5% and at 10:00 A.M. is zero.

The solar area of FIG. 4 is symmetrical about my main truss 301 which divides the hemidome into a right and left-hand portion. Each truss, shown as vertical lines in FIG. 4, is assigned a truss number such as 301R, 302R, etc. The trusses step down lower and lower until at the base edge of the hemidome it becomes unfeasible to construct additional solar support areas.

The horizontal lines in FIG. 4 depict the upper edges of the planes for housing flat solar panels. Each horizontal row of panels is assigned a letter from A through L. I call these horizontal rows "courses." The solar panels are positioned in the rectangular course areas. The primary area for solar collection is course A. This area catches a majority of the sun's rays at all times. Above horizontal course A the solar panel areas become smaller as the apex of the dome support is approached. The center point of my dome support is marked with an X at the row location shown by the upper edge of course H, where it intersects my main truss 301.

Figure 9:
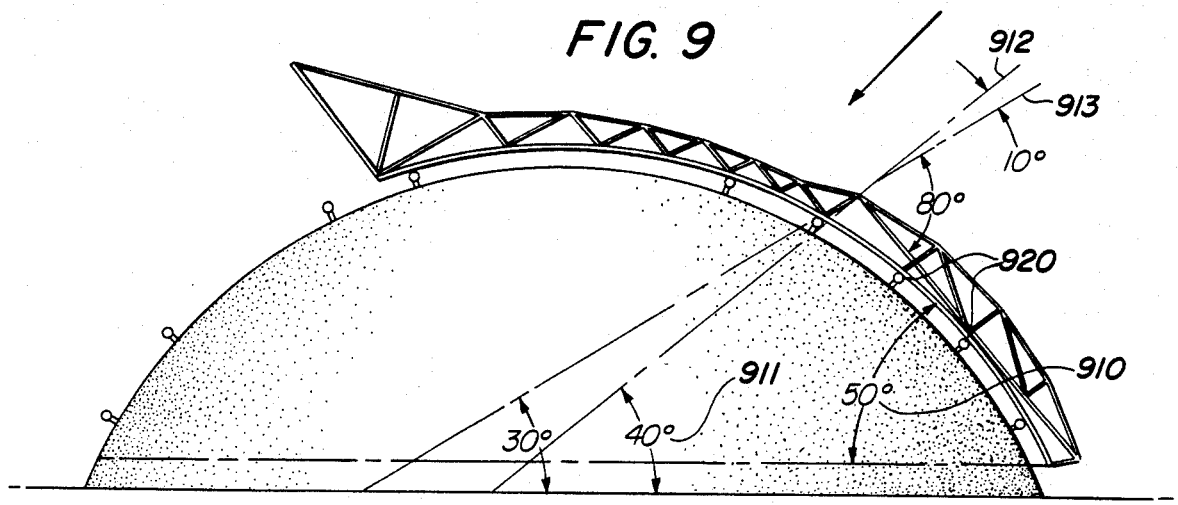
FIG. 9 is a cross-sectional view taken through the main center truss of my support structure.
Figure 12:
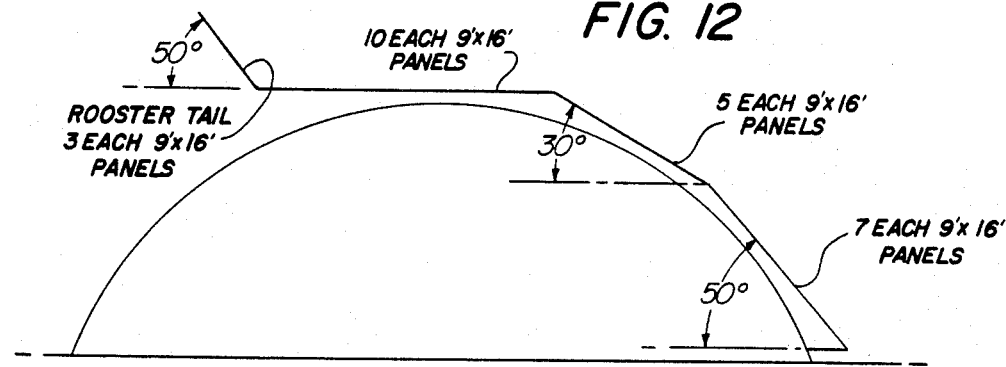
FIG. 12 depicts in highly simplified and schematic form a structure for housing a plurality of array panels made up of PV modules wherein ramp array planes are employed rather than stepped array planes as shown in some of my earlier figures.
Figure 13:
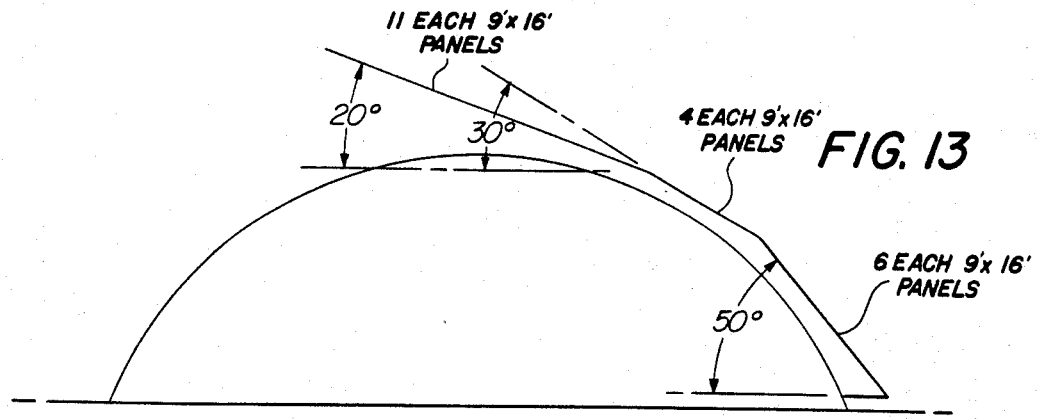
FIG. 13 is an alternate embodiment of a ramp array plane also depicted in highly simplified and schematic form.

I have selected each of my areas to accept solar panels that are produced by mass production techniques, which panels, when subjected to minor shading, reduce their power output in proportion to the area being shaded. I have also noted that some manufacturers "knock out" an entire panel due to minor shading. In such an instance, the PV arrays described in connection with FIGS. 9, 12 and 13 may be preferrable. While some slight adjustments in truss dimensions, which will be described, are necessary, the panels contained in the example of FIGS. 3 through 5 have an up 40° reciprocal sun angle and a right angle "riser" to "tread" design for each step. In FIG. 9 I have relieved the right angle step by 10°, as will be described in more detail hereinafter. In FIGS. 12 and 13 a ramp configuration eliminates the step entirely. While each of these alternate embodiments of my invention provide an improvement over all known prior art, the particular solar pattern of any given location may make one embodiment more preferable than others. Irrespective of the type of PV modules being employed, however, I have sought by my alternative embodiments of my invention to achieve essentially the maximum possible solar panel area by my support structure in comparison to the prior art.

On the downhill side beyond the apex of the hemidome, FIG. 3, the panel area, when viewed from a 50° compromise sun angle, has diminished to the point that only negligible exposure would occur if the shape of the courses were to continue the geometry that has been described. I have taken advantage of this fact by extending upwardly an extra high course L at the termination side of the hemidome. I obtain added area efficiency at that course L.

For ease of description, assume that an inner concrete dome of the above-described dimensions is in place at 36°N latitude. Pipe rails or other guides are appropriately supported on struts positioned in the inner concrete dome's outer surface. It is important to have clearance between the outer surface of the inner concrete dome and the inner surface of my hemidome space frame. The clearance is needed to vent any tendency of pressure to be built up under the solar panels during strong winds that are less than a critical amount.

In my preferred design I have established an upper wind limit of 50 MPH at which time the entire space frame will be slewed (at a rapid rate) to a position perpendicular to the wind direction. In the slewed position the PV arrays present only an edge into the wind. The procedure for implementing such slewing is conventional and need not be described in more detail at this point.

In order to design the stepped areas that support the flat PV arrays, certain design parameters are needed. Optically, the sun angle is chosen at 50° as described earlier. Structurally, the design parameter is to provide the largest possible flat rectangular surfaces for the PV arrays while remaining within a reasonable structural thickness of the space frame support members. The main center truss 301, FIG. 3, is a critical truss because any flat surfaces attached to that truss and to trusses 302R and 302L are tangent to a clearance space that is uniform around the outer surface of the inner concrete dome. The three center trusses 301, 302R and 302L are thus thinnest due to the tangential design of their array panels. Since the largest PV panels are housed at the base of the space frame, they are subjected to the largest wind pressure. Accordingly, a portion of these three trusses 301, 302R, and 302L are externally protruded beyond their PV surfaces. Beyond these three, however, the design compromise for adjoining PV panel support is a balance between the truss thickness and the width of the PV arrays.

Figure 5:
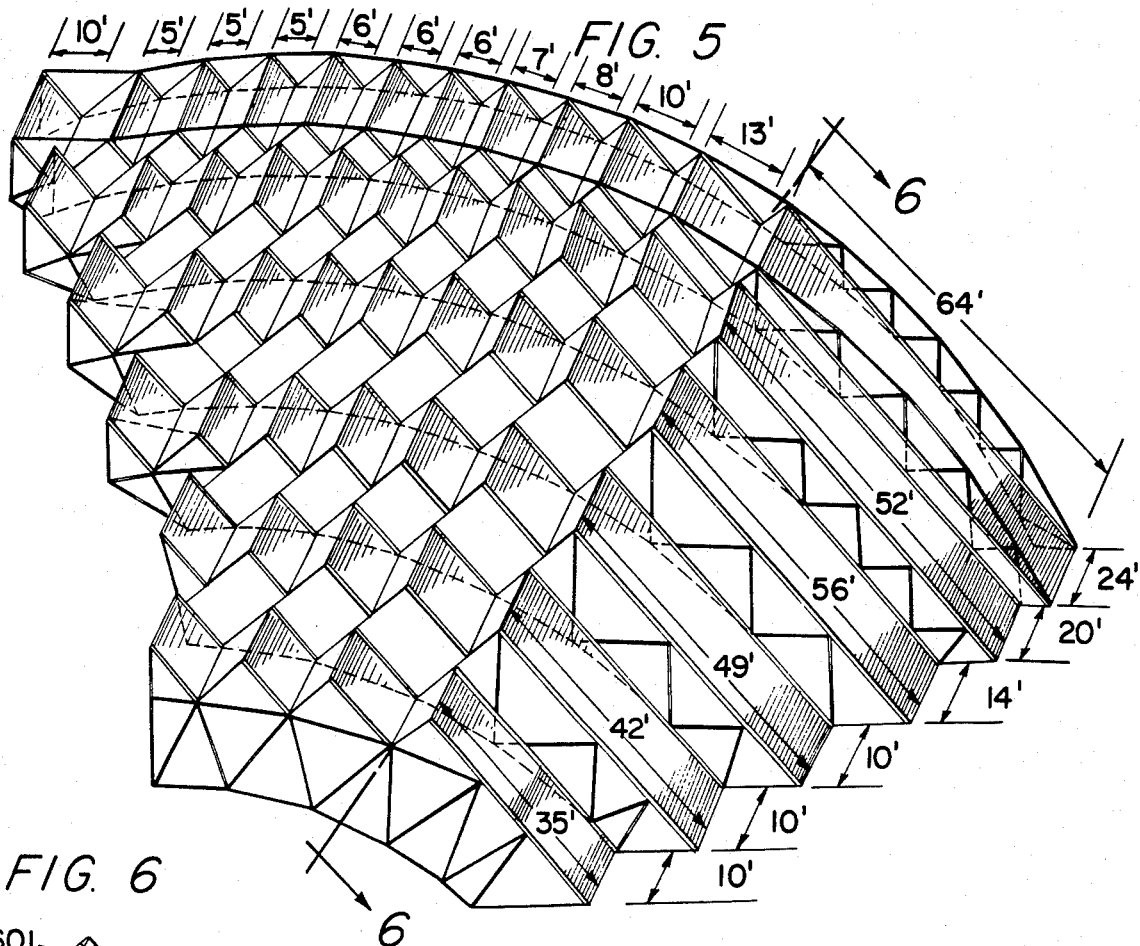
FIG. 5 is a view showing the detail of my truss supporting structure.

For my preferred embodiment, I have found dimensions shown in Table II to be nearly optimum, and representative of a practical compromise. The dimensions for my representative example are shown in FIG. 5. These diameters were found highly advantageous for panels that do not "drop-out" when subjected to minor shading. Table II reflects the area of the PV arrays at the described locations shown in FIG. 5. The values in Table II are self-explanatory when compared with FIG. 5. It should be noted that the dimensions given in Table II are theoretically optimized and do not take into consideration the manufacturing and cost advantages available from today's major commercial PV manufacturers.

TABLE II

CHART OF PHOTOVOLTAIC ARRAY DIMENSIONS AND AREAS
(Areas are doubled to take care of right and left)

| Course | Bay 301/302 | Bay 302/303 | Bay 303/304 | Bay 304/305 | Bay 305/306 | Bay 306/307 |
|---|---|---|---|---|---|---|
| A | 24 × 64 | 20 × 62 | 14 × 56 | 10 × 49 | 10 × 42 | 10 × 35 |
| Area (sq. ft) | (2 ea.) 3072 | (2 ea.) 2480 | (2 ea.) 1568 | (2 ea.) 980 | (2 ea.) 840 | (2 ea.) 700 |
| B | 24 × 13 | 20 × 13 | 14 × 13 | 10 × 13 | 10 × 13 | 10 × 13 |
| Area (sq. ft) | 624 | 520 | 364 | 260 | 260 | 260 |
| C | 24 × 10 | 20 × 10 | 14 × 10 | 10 × 10 | 10 × 10 | 10 × 10 |
| Area (sq. ft) | 480 | 400 | 280 | 200 | 200 | 200 |
| D | 24 × 8 | 20 × 8 | 14 × 8 | 10 × 8 | 10 × 8 | 10 × 10 |
| Area (sq. ft) | 384 | 320 | 224 | 160 | 160 | 200 |
| E | 24 × 7 | 20 × 7 | 14 × 7 | 10 × 7 | 10 × 10 | — |
| Area (sq. ft) | 336 | 280 | 196 | 140 | 200 | |
| F | 24 × 6 | 20 × 6 | 14 × 6 | 10 × 6 | — | — |
| Area (sq. ft) | 288 | 240 | 168 | 120 | | |
| G | 24 × 6 | 20 × 6 | 14 × 6 | 10 × 10 | — | — |
| Area (sq. ft) | 288 | 240 | 168 | 200 | | |

TABLE II-continued
CHART OF PHOTOVOLTAIC ARRAY DIMENSIONS AND AREAS
(Areas are doubled to take care of right and left)

| Course | Bay 301/302 | Bay 302/303 | Bay 303/304 | Bay 304/305 | Bay 305/306 | Bay 306/307 |
|---|---|---|---|---|---|---|
| H | 24 × 6 | 20 × 6 | 14 × 6 | — | — | — |
| Area (sq. ft) | 288 | 240 | 168 | | | |
| I | 24 × 5 | 20 × 5 | 14 × 10 | — | — | — |
| Area (sq. ft) | 240 | 200 | 280 | | | |
| J | 24 × 5 | 20 × 5 | — | — | — | — |
| Area (sq. ft) | 240 | 200 | | | | |
| K | 24 × 5 | 20 × 10 | — | — | — | — |
| Area (sq. ft) | 240 | 400 | | | | |
| L | 24 × 10 | — | — | — | — | — |
| Area (sq. ft) | 480 | | | | | |
| TOTALS (AREA IN SQ. FT) | 6960 | 5520 | 3416 | 2060 | 1680 | 1360 |
| GRAND TOTAL: | 20,996 square feet, yielding approximately 231 KW peak power. | | | | | |

Further information from various manufacturers of PV modules, such as ARCO-Solar, Inc., has made it highly desirable to use PV modules having dimensions of 1 foot × 4 feet. There is a strong economic advantage in designing 16-foot panels incorporating 36 each of such PV modules. Major quantities of these types of panel assemblies are presently in use by Sacramento Municipal Utilities District.

The panels may be prewired prior to installation on the space frame assembly. The individual PV modules that form one course which is subject to shading involve isolating a strip of 1-foot × 4-foot PV modules positioned end-to-end and electrically connected in series across the width of the course. For the example just given, each course includes either eight or nine of said strips. Although some of the courses are never subjected to shading, other courses do have shading in the early morning and late afternoon time periods. The shadow-affected portions of a course have the particular strips, which may be subject to shading, electrically connected in parallel with each other.

This improved wiring ensures that only a single strip of modules end-to-end become affected by shading at a time. If entire panels such as described in Table II were employed, I have found from my discussions with manufacturers that a minimal amount of unisolated shading will knock out the complete panel. Without the above-described isolating strips, a whole panel might go off generation because of minor shading.

The designed sun angle, depicted as 910 in FIG. 9 for the Southern California latitude, is approximately 50° measured between the arrays and the ground. The reciprocal, 40° angle 911 (for a right angle riser) is measured between the sun view and the ground. Because of this, in the original design, as shown, for example, in FIGS. 3 and 4, the sun would need to reach 40° above the horizon before the entire surface of all of the arrays would be illuminated. In order to reduce this problem directly, I have changed the step designs from a 90° relationship between the riser and the face, or tread, of the arrays, to an 80° relationship as shown by dashed lines 912 and 913. Thus for the arrays of FIGS. 9 and 9A the sun illuminates the entire surface of the arrays once the sun reaches 30° above the horizon. Light from the sun at lower angles still produces some shading; however, use of my strips generally results in loss of less power because of the orientation of the PV modules.

With reference to my 10° relief as shown in FIG. 9, zero loss from shading occurs when the sun is 30° or more above the horizon. Geometrically, the projected loss when the sun is 20° above the horizon is 6% of the shaded area. However, the sun output of energy at 20° is less than 20% of the daily average. Thus the remaining shading effect on an average day is less than 1% of the total power output of my 10% relieved configuration. Sun energy below about 20° above the horizon drops off rapidly and becomes negligible.

I do not intend to limit my invention to a 10° relief in the right angle step. Other similar small angles may be suitable. It should be noted, however, that with a relief angle of about 10°, shading is only caused when the sun is about 30° or less. Obviously, the 10° is a compromise which I have chosen to maximize the PV array area while mimimizing the shading problem. It would also be appreciated that shading is only a problem at the near horizon positions of the sun, which positions are relatively unproductive for electric power-generating purposes. My use of a 10° relief angle means that sun angles in the neighborhood of about 30° or less cause shading, and between 30° or more the sun's rays are effectively used to produce electric power. My 10° relief thus generates unshaded power earlier and later in the day by the same degree amount as the relief.

Figure 9A:
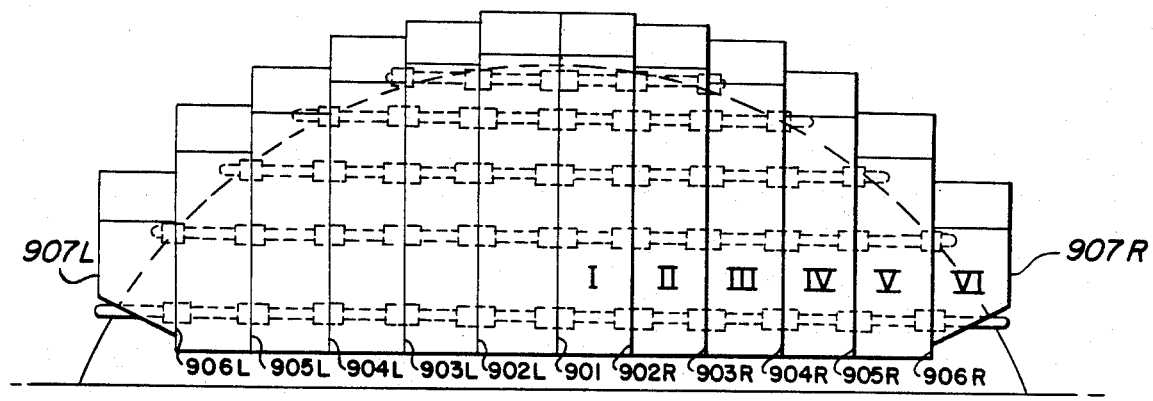
FIG. 9a is a front elevation view of FIG. 9 showing a typical configuration of parallel bays for housing a plurality of array panels made up of PV modules.

To give specifies for the power-generating capability of FIG. 9 and FIG. 9A, I have chosen, as an example, the 9-foot × 16-foot panels. I use 176 preassembled panels which represent a total of 6,408 modules or 25,344 square feet, being 81% of the dome's base area, which is 31,416 square feet. This configuration will produce approximately 256,320 watts of factory-rated peak power per 200-foot diameter dome, 67 feet high. This also relates to a "packing density" of electrical production per acre of 256 KWP which is 4.26 times greater than "state of the art" double-tracking field installations.

Comparison between Table II and only the 10° relieved configuration using 9-foot × 16-foot panels shows that my total square feet of aperture area has increased from 20,996 square feet to 25,344 square feet; and at the same time the shading problem has been substantially eliminated. My factory-rate peak power has increased from 231 KW to 256 KW. In this preferred embodiment 110 panels are always free from shading during daylight hours, and 66 panels remain affected at sun angles under 30° above the horizon. My strip positioning and electrical wiring connections has minimized the shading effect while still improving total power production.

In FIG. 4 the planes are shown as horizontal lines between courses A through L. Note in FIG. 4 that the deck plane of the hemidome forces the PV arrays to be foreshortened. The foreshortening is into the plane of the deck as shown in my FIG. 4.

Now the width of the bays needs to be discussed. In accordance with my Table II, I have selected bay width values depicted in FIG. 5, starting the bay widths with 24 feet for bay 301/302L; 20 feet for bay 302L/303L; 14 feet for bay 303L/304L and 10 feet each for the three remaining bays, 304L/305L, 305L/306L, and 306L/307L.

As shown in FIG. 4, each course (shown as a horizontal row) is in reality defined by the edges of two planes located at the shadow line. FIG. 5 shows that the longitudinal depth of the "treads" of the PV arrays is the same throughout a course. The courses from the middle ones outward in both the right and left-hand directions have a constant longitudinal depth throughout each given course. Reference to Table II shows that the terminating PV array in bay 302L/303L is at course K, in bay 303L/304L at course I, in bay 304L/305L at course G, in bay 305L/306L at course E and in bay 306L/307L at course D. I call this group of upstanding PV array locations a terminating course. The areas that they add to my total solar aperture are shown at their respective locations in Table II.

It is important to note that the total elliptical picture of the space frame array area, FIG. 4, when viewed from a compromise 50° sun angle is a solid contiguous grouping of rectangular PV arrays. This fact allowed me to optimize the square footage available for energy production on my dome-like space frame structure 300. The projected elliptical view of the inner concrete dome is almost 95% covered by the PV array.

FIG. 5 depicts a perspective view of the left-hand portion of FIGS. 3 and 4. FIG. 5 repeats the dimensions of Table II. The shaded areas reflect the flat locations where solar panel arrays are located. The arrays are not depicted in FIG. 5 for clarity purposes. The straight lines of FIG. 5 form the truss design which is assembled in accordance with my method described above.

In FIG. 5 I have not depicted the cross-supports at the upper edge of each course, again for clarity purposes. Plane 6—6 is shown located at the upper edge, or "tread" of course A. At each upper edge and at intervals as necessary, cross-supports are used for bracing and rigidizing my space frame.

Figure 6:
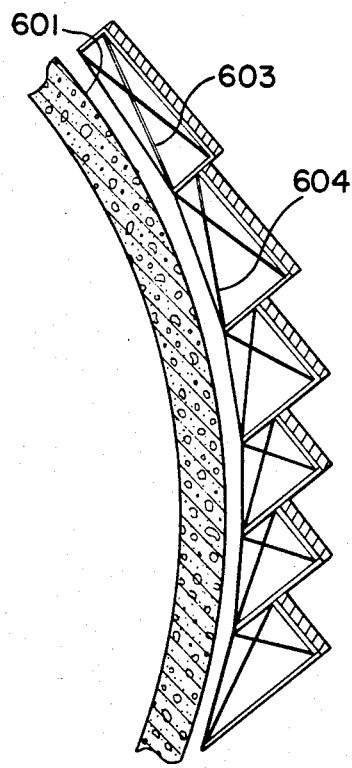
FIG. 6 is a view taken along the plane shown as 6—6 in FIG. 5, showing the close contoured proximity of the inside of the array frame to the outer surface of an inner and supporting dome-shaped structure.

FIG. 6 shows a plan view of the plane 6—6 of FIG. 5. As shown in FIG. 6, the cross members will serve the dual purpose of joining the various trusses while at the same time forming a curved section that follows, for example, the outer dome surface of an inner concrete dome. In FIG. 6 a cross-section of the concrete dome shell is depicted. The space between the outer surface 601 and the adjacent struts such as 603, 604, etc., of the space frame is necessary to accommodate the pipe rail 345, FIG. 3, and the wheels upon which the space frame will ride. Additionally, the space will permit wind to pass beneath the PV array panels so that pressure does not build up under the PV panels. Extra locking wheels are provided on pipe rail 345 to prevent lifting of the entire assembly off the intermediate guide rails on the dome in a high wind. These locking wheels contact the rail 345 somewhat under its outer edge in a manner highly perfected in the "Matterhorn" roller coaster ride at Disneyland, as depicted in FIGS. 10, 10A and in a power-driven version used in my invention as depicted in FIG. 11.

FIG. 10 depicts an end view in cross-section of one of the pipe rails shown in FIG. 9. These pipe rails may be any suitable steel or other rigid material. For example, if five pipe rails of FIG. 9A are used, then an 8-inch heavy duty (Schedule 80) steel pipe 920 is welded to a support 914 which is suitably attached to the inner dome shell surface. A pair of load support wheels 921, FIGS. 10 and 10A, are rotatably mounted on axles 922 which are suitably supported in appropriate fashion in a support chassis 923. Chassis 923 extends down and near the bottom of pipe rail 920 in order to support a pair of rotatable "keeper" wheels 924 which are also suitably axled and housed in chassis 923. These keeper wheels prevent wind uplift from possibly derailing the space frame structure.

All of the wheels are concave in shape to mate with the pipe rail and preferably have a permanent bakedon Teflon or other elastomeric coating which may be about ⅛-inch thick. The axles and bearings are chosen from a suitable material such as stainless steel and are weather and dust-sealed with permanent lubrication, as is readily known in the art. The chassis 923 acts as a housing and also provides additional weather protection for the axles, wheels and bearings.

FIGS. 10 and 10A also depict a plurality of bracing structures such as an upright telescopic support 925 and an angled bracing 926. Both the support 925 and bracing 926 at each wheel support location will be field fitted to the adjacent truss structure, a portion of which is shown and labeled in FIG. 10. The truss structure rides on a pillow block 927 which is field welded or otherwise suitably and permanently fastened together in place at every intersection of a truss and a pipe rail. Typically, the wheel and bracing support assembly of FIG. 10 and FIG. 10A are shown in simplified form as dotted boxes in FIG. 9A. It should be understood that such assemblies are also located at the intersections of the upper piper rails and trusses over the apex of the dome.

The free-rolling wheel assemblies will be located at the upper rails. The bottom rail is reserved for a motor-driven support depicted and described in FIG. 11.

FIG. 11 depicts an internal view of one suitable way of driving the wheel assembly. Since the greatest amount of the space frame weight is borne by the bottom rail, that weight is employed to advantage as traction for my motor-driven wheel drive assembly 950, FIG. 11.

The chassis, wheels, bearings and bracing and support system of FIG. 11 is interchangeable with the free-rolling structure of FIGS. 10 and 10A and thus need not be further described herein. Additionally, however, drive assembly 950 includes a power-supplying mechanism 951 which includes a suitable motor 952 and gear train 953.

Gear train 953 engages a drive shaft 954 which is supported by three line bearings 955, 956 and 957. Machined into this stainless steel shaft 954 at its extremities is a worm gear drive 958. The drives 958 engage a matching radial helical beveled gear 959 which imparts motion to the wheels when the motor 952 is energized.

Not shown in FIG. 11 is a splined internal axle for each drive wheel, which axle is either engaged by a solenoid which is responsive to the motor current or is disengaged by a spring loading when the solenoid is not activated. This splined internal axle system is needed because without it a free-wheeling system might allow position override in a high wind. It is obvious to a person skilled in the state-of-the-art that the system would not drive the space frame at all if one driven wheel assembly 950 malfunctioned electrically. The spring and solenoid disengage operation will permit the malfunctioning driven wheel assembly 950 to ride free and not cause a drag or otherwise bind the remaining and operative drive units.

An indicator signal to a master computer (not shown) will supply to the operator the identity of the malfunctioning driven wheel assembly 950. Preferably, the entire drive assembly will be controlled by a state-of-the-art computer so that it accelerates with the sun's apparent angular acceleration to noon and apparent angular deceleration during the afternoon. The computer also senses and detects cumulative timing errors every 24 hours until the precomputed position is attained. Such computer-controlled systems employing microprocessors are already known and are readily available as "off-shelf" items and thus need not be described in any more detail in this application.

FIGS. 5 and 6 are self-explanatory in depicting the manner in which each cross-strut connects and supports the adjacent bays for PV arrays. The PV arrays are shown cross-hatched in FIG. 6. The cross-hatched sections are the flat solar PV surfaces which are clearly depicted in FIG. 3. Conventional electrical connections connect all of the arrays together for either direct current or with the use of existing devices, alternating current. Since such conventional techniques are well known they need not be described further. Reference may be made if desired to the above-noted ARCO-Solar News release. ARCO-Solar, Inc. and other similar companies have ample literature available upon request which describe in detail the solar power conversion, computer control tracking systems, optical controls, etc.

In FIG. 9A the bays are designated by Roman numerals, as shown for the right-hand side of the symmetrical array structure respectively as I through VI. Assuming use of the 9-foot×16-foot panels using the 1-foot×1-foot PV modules from ARCO-Solar, Inc., the following Table III will indicate:

TABLE III

| Panel Size (Feet) | Bay | Face Panels | Step Panels | Tail Panels | Total Panels | Total Both Sides | Total Square Feet |
|---|---|---|---|---|---|---|---|
| 9 × 16 | I | 8 | 6 | 3 | 17 | 34 × 144 = | 4,896 |
| 9 × 16 | II | 8 | 6 | 3 | 17 | 34 × 144 = | 4,896 |
| 9 × 16 | III | 8 | 5 | 3 | 16 | 32 × 144 = | 4,608 |
| 9 × 16 | IV | 7 | 5 | 3 | 15 | 30 × 144 = | 4,320 |
| 9 × 16 | V | 7 | 3 | 3 | 13 | 26 × 144 = | 3,744 |
| 9 × 16 | VI | 5 | 3 | 2 | 11 | 21 × 144 = | 3,024 |
| Total 9-foot × 16-foot panels used: 176 | | | | | | | 25,344 |
| Total 1-foot × 4-foot modules used: 6,408 | | | | | | | |

SHADING EFFECT: 110 panels, 15,840 square feet, 3960 1-foot × 4-foot modules, not shaded. Sixty-six panels, 9,504 square feet, 2,752 1-foot × 4-foot modules have shading reduced by 10°. No shading at 30° or more sun angle.

As noted earlier, FIG. 9A was taught as being typical of one particular embodiment. One other non-limiting example uses the 8-foot ×20-foot panels with 1-foot ×4-foot PV modules. Table IV is representative of such an embodiment. Table IV indicates as follows:

TABLE IV

| Panel Size (Feet) | Bay | Face Panels | Step Panels | Tail Panels | Total Panels | Total Both Sides | Total Square Feet |
|---|---|---|---|---|---|---|---|
| 8 × 20 | I | 9 | 6 | 3 | 18 | 36 × 160 = | 5,760 |
| 8 × 20 | II | 8 | 5 | 3 | 16 | 32 × 160 = | 5,120 |
| 8 × 20 | III | 7 | 3 | 4 | 14 | 28 × 160 = | 4,480 |
| 8 × 20 | IV | 7 | 2 | 3 | 12 | 24 × 160 = | 3,840 |
| 8 × 20 | V | 5 | 2 | 3 | 10 | 20 × 160 = | 3,200 |
| Total 8-foot × 20-foot panels used: 140 | | | | | | | 22,400 |
| Total 1-foot × 4-foot modules used: 5,600 | | | | | | | |

SHADING EFFECT: 104 panels; 16,640 square feet, 4,160 1-foot × 4-foot modules, not shaded. Thirty-six panels, 5,760 square feet; 1,440 1-foot × 4-foot modules have shading reduced by 10°. No shading at 30° or more sun angle.

As further nonlimiting examples, combinations of 9-foot ×16-foot and 8-foot ×20-foot panels are contemplated. Various combinations have both advantages and disadvantages that will be readily appreciated by anyone skilled in this art. The combinations offered no significant advantages over the relatively simpler configurations of Tables III and IV.

Figure 7A:
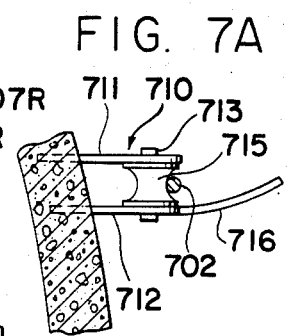
FIGS. 7, 7A, 7B, and 7C are schematic diagrams depicting a typical drive mechanism for my support structure.

As described earlier, my invention preferably rotates about a single axis with my solar PV arrays fixed upwardly at a compromise sun angle. A drive system for that preferred embodiment is depicted in schematic form in FIG. 7, which is a cross-sectional plan view that depicts the base of the inner concrete dome 700. That dome 700 is stationary and has at its periphery a series of cable retaining arms and idler pulleys 710. A typical pulley which would be mounted around the periphery of the base of the dome 700 is shown in FIG. 7A as idler unit 710. Each idler unit includes a pair of supports 711, 712 which are embedded at one end into the concrete and at the other end have an axle 713 for housing an idler wheel or pulley 715.

A cable-retaining arm 716 keeps the cable from dropping away from the pulleys 715 and also ensures that the cable 702 does not drape away from its guided location.

Figure 7:
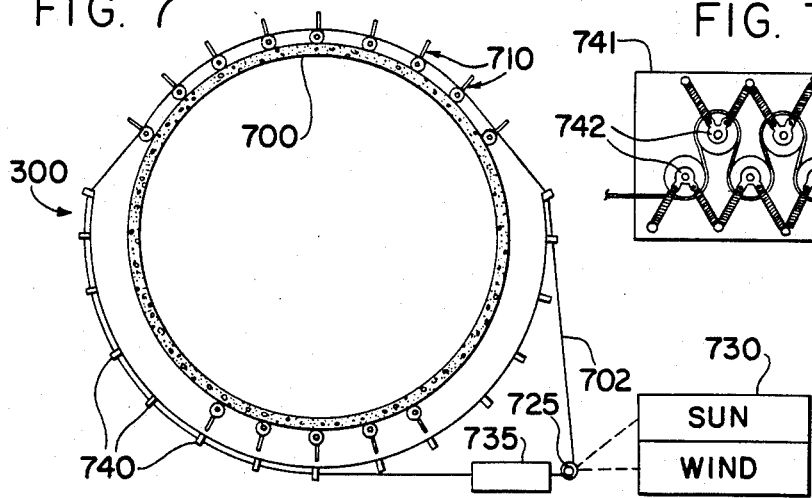

In FIG. 7 the capstan drive 725 is located remote from the dome 700 and the space frame support structure 300. Cable 702 wraps around the capstan 725 for a given number of turns to supply traction in a conventional winch manner. Capstan drive 725 is turned at a desired rotational speed that is dependent upon the size of the dome, the space frame support, and the mode of operation. Two different motor-driven speeds by motor drive 730 is advantageous. One motor speed drives the space support frame at approximately six inches per minute of cable travel. This slow movement allows the sun to be followed by the space support frame structure. The second motor speed is employed to quickly slew the space frame into a right angle position to wind direction and overrides the drive ratio of the first motor speed. In that right angle position, the wind blows through the truss structure and will not damage the PV arrays.

The sun-following movement is first described in more detail. Using the example of a 200-foot diameter for the outer surface of the concrete dome at its base, the rate of rotational movement may be readily calculated. Assuming that the diameter of the space frame structure is 224 feet, that diameter multiplied by π multiplied by 12 inches converts to almost 8,450 inches. The total number of inches divided by 24 hours, and divided further by 60 minutes per hour, yields approximately six inches per minute of required cable travel. In well known fashion, this cable movement is related to the diameter of the capstan so that precisely controlled gear train ratios for the motor driving the capstan are readily selected. Such selection, gears, motors and the like are well known and need no further description. Suffice is to say that the above-stated calculation shows clearly that the movement to follow the sun is positively controlled. At the Hesperia location, computer controls accomplish exactly that function and are well within the ordinary skill of the art.

Figure 7B:
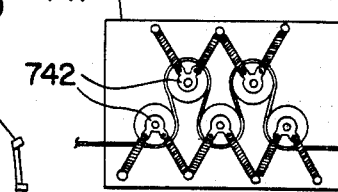
Figure 7C:
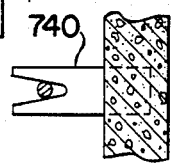

In the schematic diagram of FIG. 7, the motor 730 is shown simply as having two drive options, "sun" and "wind." Before describing the wind movement, the forks 740 shown in FIG. 7C need some explanation. These forks 740 are located at spaced intervals along the base of the space frame support. The projections in FIG. 7 represent these forks 740. The forks 740 grip the cable 702 securely enough to yield positive rotational force. Thus they provide resistance to prevent cable 702 from sliding and yet will release cable 702 when it peels tangentially away from the space frame to return to capstan drive 725.

On the slack side of capstan 725 is a slack tensioning device 735. FIG. 7B gives a schematic view of the details for slack removal via a series of spring-mounted pulleys which are securely fastened at one end within housing 741. Each pulley rotates within a yoke 742. Connected to the U-shaped yokes 742 are heavy coiled springs which are in tension so that the cable 702 is held taut as it passes over the pulley mounted via yokes 742.

The pulleys obviously remove any slack in cable 702. The combination as just described provides a predetermined amount of cable tension on the pickup and release sides of capstan 725.

A wind anemometer (not shown) is suitably mounted on the space frame 300. The anemometer detects and emits electrical signals indicative of the wind velocity and direction. After a predetermined high amount of wind has been detected for a time sufficient to guard against unwarranted movement due to wind gusts, the computer receiving the signals slews the space frame to a safe position. Once the wind has dropped below the critical velocity for a predetermined time, when the space frame is returned at the higher wind rotational speed to its correct position.

Positioning the space frame properly is simplified by a series of position signal transmitters and receivers indicative of the six minute intervals at the periphery of the space frame. The computer has stored within its memory the sun location at a given clock time. Thus the space frame must face that direction in attitude at the proper time. When the computer receives the position signals from the space frame and confirms a time match within the computer the motor drive is removed from the "wind" speed and returns to its "sun" speed. From that point on the space frame is rotated to follow the sun's movement. Such a system with computer controlled clocks and wind speed drive is well within the skill of the art and does not require further description.

A series of computer studies, Appendix A, attached, are summarized in Table V. This summary Table V has computed the added efficiency that would be yielded if double axis tracking were employed. As shown by the summary double axis tracking with calendar correction has been computed as the most efficient system and is accorded 100%.

TABLE V

| ANNUAL ENERGY OUTPUT | | |
| --- | --- | --- |
| Fixed Position Due South Compromise Sun Angle | Single Axis Tracking At Compromise Sun Angle | Double Axis Tracking |
| 325,446 KW-HRS. (70% Efficient) | 449,561 KW-HRS (96.7% Efficient) | 464,809 KW-HRS. (100% Efficient) |

In each instance comparable circumstances were applied for the computer simulation study of Appendix A. The panels were a model known as M51-39 from ARCO-Solar, Inc. Thirty-two PV modules were connected in series and 141 PV modules were connected in parallel in all instances. The total number of PV modules were 4512 and yielded 18,048 square feet of efficient net aperture area. A location at Bakersfield, Calif., which is 36° N. latitude, was chosen as a site location for the computer study. Three system configurations were assumed, with each system having as a further assumption, full access to the sun over a full solar day with no shadows. The representative printout reveals average daily output by the hour for each month.

The three systems involved are shown in the headings of Table V. The yearly total is shown for each system. By using the double axis system as a 100% reference, the single axis system is 96.7% efficient in comparison, whereas the fixed panel facing up at 50° and always pointing due south is 70% efficient.

I will now describe the mechanisms which my invention employs in achieving double axis tracking capability. While it is somewhat more efficient than my preferred embodiment (3.3%), the added complexity when weighed against the increased efficiency may in some circumstances justify the cost of increased hardware. The computer study indicates an annual theoretical advantage, in favor of double axis, of 15,248 KW-HRS between the single and double axis tracking. 15,248 KW-HRS per year represents, particularly in some areas, a sizeable electrical cost. It should be the customer's option taking all circumstances into consideration as to the possible use and cost effectiveness of double axis tracking.

Figure 8:
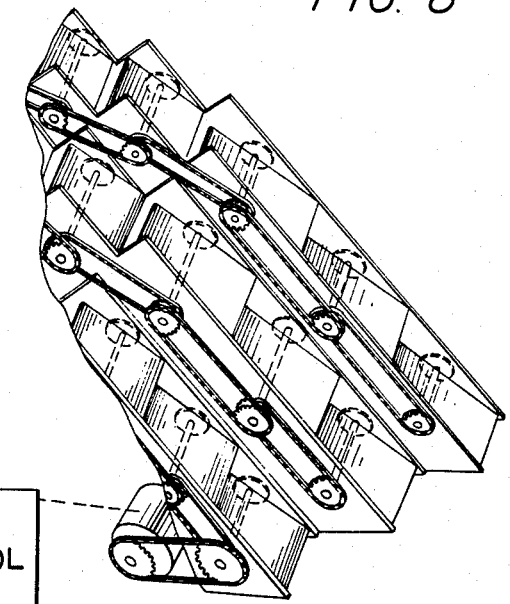
FIG. 8 is one illustrative mechanism for achieving double axis tracking for my support structure.

FIG. 8 depicts in highly schematic fashion a way of moving the PV panels so that they tilt toward the sun as the sun moves. As shown in FIG. 8, each lower tangential course is broken up into venetian blind-like segments. Dual sprockets are fastened on an axis which spans across the venetian blind-like panels. A chain drive connects adjacent panel segments to each other so that any panel that moves in response to an interconnecting sprocket will reflect similar movement in all of the panel segments in that one bay.

Either a computer control or an optical tracking system, well known to the art, will cause adjustment of the panel segments to follow the sun's movement in elevation. The technology to accomplish the elevation tracking of the sun is well known and need not be explained. Many typical installations are available which have the venetian blind-like arrangement of my FIG. 8.

I have herein described with respect to FIG. 8 a means for achieving double axis tracking for all of the flat PV panels of my total solar array. It should be understood that since the majority of the solar rays are captured by course A next to the hemidome's base, it may be more desirable and expedient to make only that one course capable of double axis tracking. In any event, however, I have clearly described in my invention that I prefer single axis tracking for the support structure of my invention.

FIGS. 12 and 13 depict "ramp" configurations which do not employ steps and which do not suffer from "shading." In highly simplified form, FIG. 12 shows the shape of the center truss and its housed panels. Although not shown, the other trusses and panels will follow the typical form shown in the elevational view of FIG. 9A. Rather than draw these panels, FIG. 12 makes use of legends which define the array angle relative to ground and the number and dimensions of a typical panel configuration. For example, in accordance with the legend of FIG. 12, there are ten 9-foot ×16-foot panels at 50°, five each of said panels at 30° and ten each at 1°, to total twenty-five panels for the ramp configuration.

FIG. 13 depicts an alternate ramp configuration. The structure of FIG. 13 is a relatively efficient selection since it avoids the 1° surface of FIG. 12 and still incorporates 21 9-foot ×16-foot panels, horizontally disposed. The lowest six panels are on the standard 50° slant, the next four are on a 30° slant and the final eleven are on a 20° slant.

While FIGS. 9 and 9A only had 17 9-foot ×16-foot panels in the Roman numeral I bay, those panels were all on the more productive 50° angle, and thus the structure of FIGS. 9 and 9A produced more energy at substantially lower cost than the twenty-four panels of FIG. 12 or the twenty-one panels of FIG. 13. However, at certain latitudes, particularly where more equatorial overhead sun angles are prevalent, the ramp configurations of FIGS. 12 and 13 may prove simple, convenient and structurally economical for the power generation at those latitude locations. As I have explained earlier, the embodiments other than FIGS. 12 and 13 appear more cost- and energy-producing effective at Northern latitudes.

The above description presents the best mode contemplated in carrying out the present invention. This invention is, however, susceptible to modifications and alternate constructions from the embodiments shown in the drawings and described above. Consequently, it is not the intention to limit the invention to the particular embodiments disclosed. On the contrary, the invention is to cover all modifications, sizes and alternate constructions falling within the spirit and scope of the invention as expressed in the appended claims.

```
           FIXED POSITION FACING DUE SOUTH
              AT 50° COMPROMISE SUN ANGLE

LAX
PV SYSTEM PERFORMANCE ESTIMATION PROGRAM
Ver. 3.2     1/31/83

W.R.REED
6/9/83                    MONOLITHIC

SYSTEM LOCATION:  BAKERSFIELD, CAL.
LATITUDE:   35.42 N

ARRAY SIZE:  32 IN SERIES  X  141 IN PARALLEL   M51-39 MODULES

ARRAY TILT:  50.0 DEGREES, FACING DUE SOUTH

SYSTEM APPLICATION:  MAX POWER TRACKING

MONTH:  JAN
HORIZONTAL LANGLEYS:   208
PANEL LANGLEYS:        341

SOLAR    PANEL      CELL         SYSTEM      SYSTEM      SYSTEM
HOUR     KW/SQM     TEMP (C)     VOLTAGE     AMPERES     POWER (KW)
-----    ------     --------     -------     -------     ----------

8      0.185       7.2          475.65       46.59       22.161
  9      0.374      13.9          577.39      108.01       62.363
 10      0.514      19.9          572.01      154.96       88.641
 11      0.599      24.5          556.25      184.10      103.521
 12      0.627      27.1          548.00      196.65      107.765
 13      0.599      27.4          548.34      186.83      102.450
 14      0.514      25.3          557.52      156.36       87.175
 15      0.374      21.0          556.58      109.91       61.394
 16      0.185      15.1          455.21       48.51       22.082

DAILY TOTAL OF DC ENERGY DELIVERED BY THE ARRAY:    656.737 KW-HRS
```

APPENDIX A

```
MONTH:  FEB
HORIZONTAL LANGLEYS:   299
PANEL LANGLEYS:        419
```

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 7  | 0.050 | 5.2  | 152.98 | 9.92   | 1.518   |
| 8  | 0.271 | 12.4 | 585.45 | 66.94  | 39.188  |
| 9  | 0.463 | 19.4 | 559.61 | 140.75 | 78.766  |
| 10 | 0.608 | 25.6 | 552.87 | 189.65 | 104.851 |
| 11 | 0.695 | 30.2 | 536.56 | 221.17 | 118.670 |
| 12 | 0.723 | 32.7 | 528.16 | 231.62 | 122.334 |
| 13 | 0.695 | 33.1 | 528.45 | 221.87 | 117.244 |
| 14 | 0.608 | 31.0 | 537.84 | 191.00 | 102.727 |
| 15 | 0.463 | 26.7 | 539.75 | 142.63 | 76.984  |
| 16 | 0.270 | 20.8 | 563.42 | 69.22  | 39.000  |
| 17 | 0.050 | 13.9 | 130.93 | 11.15  | 1.460   |

DAILY TOTAL OF DC ENERGY DELIVERED BY THE ARRAY:     801.826 KW-HRS

```
MONTH:  MAR
HORIZONTAL LANGLEYS:   433
PANEL LANGLEYS:        499
```

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 7  | 0.135 | 9.9  | 388.13 | 26.50  | 10.284  |
| 8  | 0.349 | 17.1 | 570.43 | 93.18  | 53.152  |
| 9  | 0.547 | 24.4 | 558.55 | 166.86 | 93.200  |
| 10 | 0.693 | 30.7 | 535.10 | 220.75 | 118.123 |
| 11 | 0.777 | 35.2 | 518.71 | 251.49 | 130.451 |
| 12 | 0.804 | 37.7 | 510.34 | 261.51 | 133.457 |
| 13 | 0.777 | 38.1 | 510.43 | 252.16 | 128.710 |
| 14 | 0.693 | 36.2 | 519.60 | 222.06 | 115.379 |
| 15 | 0.546 | 32.0 | 537.76 | 168.74 | 90.743  |
| 16 | 0.349 | 26.1 | 546.76 | 95.47  | 52.201  |
| 17 | 0.135 | 19.4 | 363.71 | 28.50  | 10.365  |

DAILY TOTAL OF DC ENERGY DELIVERED BY THE ARRAY:     935.222 KW-HRS

```
MONTH:  APR
HORIZONTAL LANGLEYS:   568
PANEL LANGLEYS:        537
```

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 6  | 0.030 | 9.6  | 105.13 | 8.17   | 0.859   |
| 7  | 0.180 | 14.9 | 456.76 | 36.57  | 16.703  |
| 8  | 0.389 | 22.2 | 555.80 | 104.97 | 58.344  |
| 9  | 0.583 | 29.5 | 543.37 | 179.93 | 97.767  |
| 10 | 0.725 | 35.6 | 520.06 | 233.27 | 121.314 |
| 11 | 0.807 | 39.9 | 504.02 | 262.99 | 132.552 |
| 12 | 0.833 | 42.3 | 495.81 | 272.83 | 135.271 |
| 13 | 0.807 | 42.7 | 495.91 | 263.61 | 130.727 |
| 14 | 0.725 | 41.0 | 504.74 | 234.49 | 118.360 |
| 15 | 0.583 | 37.0 | 522.53 | 181.69 | 94.938  |
| 16 | 0.389 | 31.3 | 531.61 | 107.21 | 56.996  |

| 17 | 0.179 | 24.9 | 431.16 | 38.83 | 16.743 |
| 18 | 0.030 | 19.7 | 116.60 | 7.96 | 0.928 |

DAILY TOTAL OF DC ENERGY DELIVERED BY THE ARRAY: 981.031 KW-HRS

MONTH: MAY
HORIZONTAL LANGLEYS: 681
PANEL LANGLEYS: 557

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 6 | 0.060 | 14.3 | 204.09 | 15.82 | 3.228 |
| 7 | 0.200 | 19.7 | 443.89 | 43.47 | 19.294 |
| 8 | 0.406 | 27.1 | 542.55 | 108.74 | 58.995 |
| 9 | 0.596 | 34.3 | 529.93 | 181.67 | 96.272 |
| 10 | 0.736 | 40.3 | 506.18 | 237.42 | 120.176 |
| 11 | 0.818 | 44.7 | 489.79 | 268.14 | 131.332 |
| 12 | 0.846 | 47.1 | 481.35 | 278.41 | 134.015 |
| 13 | 0.818 | 47.5 | 481.60 | 268.74 | 129.425 |
| 14 | 0.735 | 45.8 | 490.64 | 238.60 | 117.067 |
| 15 | 0.596 | 42.0 | 508.61 | 183.40 | 93.280 |
| 16 | 0.406 | 36.5 | 517.46 | 110.98 | 57.426 |
| 17 | 0.200 | 30.2 | 465.16 | 42.87 | 19.943 |
| 18 | 0.060 | 25.2 | 230.80 | 15.95 | 3.680 |

DAILY TOTAL OF DC ENERGY DELIVERED BY THE ARRAY: 983.925 KW-HRS

MONTH: JUN
HORIZONTAL LANGLEYS: 746
PANEL LANGLEYS: 571

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 5 | 0.010 | 15.7 | 62.16 | 2.45 | 0.152 |
| 6 | 0.073 | 18.5 | 247.38 | 19.64 | 4.857 |
| 7 | 0.207 | 23.9 | 481.10 | 43.37 | 20.867 |
| 8 | 0.415 | 31.5 | 530.73 | 110.89 | 58.851 |
| 9 | 0.605 | 38.8 | 517.37 | 183.47 | 94.923 |
| 10 | 0.747 | 44.9 | 492.63 | 242.04 | 119.237 |
| 11 | 0.833 | 49.4 | 475.53 | 274.10 | 130.340 |
| 12 | 0.862 | 51.9 | 479.48 | 277.56 | 133.081 |
| 13 | 0.832 | 52.3 | 467.12 | 274.68 | 128.308 |
| 14 | 0.747 | 50.5 | 476.64 | 243.21 | 115.924 |
| 15 | 0.605 | 46.8 | 495.39 | 185.19 | 91.744 |
| 16 | 0.414 | 41.2 | 504.70 | 113.14 | 57.101 |
| 17 | 0.207 | 34.8 | 499.62 | 43.06 | 21.516 |
| 18 | 0.073 | 30.1 | 253.59 | 20.17 | 5.116 |
| 19 | 0.010 | 27.2 | 61.11 | 3.24 | 0.198 |

DAILY TOTAL OF DC ENERGY DELIVERED BY THE ARRAY: 982.072 KW-HRS

MONTH: JUL
HORIZONTAL LANGLEYS: 728
PANEL LANGLEYS: 574

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 5 | 0.004 | 19.0 | 53.99 | 0.53 | 0.029 |
| 6 | 0.067 | 21.9 | 239.15 | 17.85 | 4.270 |
| 7 | 0.205 | 27.4 | 472.11 | 43.46 | 20.518 |
| 8 | 0.417 | 35.2 | 520.64 | 113.00 | 58.834 |
| 9 | 0.612 | 42.8 | 505.75 | 187.65 | 94.941 |

| | | | | | |
|---|---|---|---|---|---|
| 10 | 0.756 | 49.1 | 480.16 | 246.40 | 118.312 |
| 11 | 0.843 | 53.8 | 475.06 | 271.40 | 128.932 |
| 12 | 0.872 | 56.4 | 465.89 | 282.23 | 131.405 |
| 13 | 0.843 | 56.8 | 466.19 | 272.01 | 126.806 |
| 14 | 0.756 | 55.1 | 463.24 | 247.59 | 114.692 |
| 15 | 0.611 | 51.2 | 481.73 | 189.40 | 91.431 |
| 16 | 0.416 | 45.4 | 493.25 | 115.30 | 56.871 |
| 17 | 0.205 | 39.9 | 489.31 | 43.26 | 21.166 |
| 18 | 0.067 | 32.9 | 244.13 | 18.45 | 4.504 |
| 19 | 0.004 | 31.0 | 51.89 | 1.33 | 0.069 |

DAILY TOTAL OF DC ENERGY DELIVERED BY THE ARRAY: 972.812 KW-HRS

MONTH: AUG
HORIZONTAL LANGLEYS: 657
PANEL LANGLEYS: 585

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 6 | 0.042 | 19.5 | 191.42 | 10.40 | 1.990 |
| 7 | 0.197 | 25.4 | 429.42 | 43.06 | 18.491 |
| 8 | 0.422 | 33.5 | 524.83 | 116.46 | 61.123 |
| 9 | 0.631 | 41.5 | 508.21 | 197.74 | 100.496 |
| 10 | 0.786 | 48.2 | 481.14 | 257.29 | 123.793 |
| 11 | 0.876 | 53.1 | 475.20 | 282.90 | 134.435 |
| 12 | 0.906 | 55.9 | 465.63 | 293.94 | 136.868 |
| 13 | 0.876 | 56.3 | 465.90 | 283.54 | 132.099 |
| 14 | 0.785 | 54.4 | 463.50 | 258.52 | 119.824 |
| 15 | 0.631 | 50.1 | 484.19 | 199.56 | 96.625 |
| 16 | 0.421 | 43.9 | 496.88 | 118.81 | 59.035 |
| 17 | 0.196 | 36.9 | 448.06 | 42.70 | 19.130 |
| 18 | 0.042 | 31.4 | 161.27 | 12.10 | 1.952 |

DAILY TOTAL OF DC ENERGY DELIVERED BY THE ARRAY: 1005.190 KW-HRS

MONTH: SEP
HORIZONTAL LANGLEYS: 540
PANEL LANGLEYS: 580

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 6 | 0.008 | 15.5 | 62.68 | 1.68 | 0.106 |
| 7 | 0.169 | 21.2 | 440.92 | 34.20 | 15.079 |
| 8 | 0.409 | 29.6 | 535.30 | 114.54 | 61.314 |
| 9 | 0.633 | 38.0 | 517.35 | 200.30 | 103.624 |
| 10 | 0.799 | 45.3 | 488.93 | 261.48 | 127.843 |
| 11 | 0.895 | 50.5 | 481.83 | 289.01 | 139.253 |
| 12 | 0.926 | 53.4 | 471.76 | 300.47 | 141.747 |
| 13 | 0.895 | 53.9 | 472.02 | 289.69 | 136.741 |
| 14 | 0.799 | 51.7 | 470.48 | 262.80 | 123.642 |
| 15 | 0.632 | 46.9 | 492.54 | 202.26 | 99.619 |
| 16 | 0.409 | 40.2 | 506.99 | 116.99 | 59.314 |
| 17 | 0.168 | 32.6 | 411.59 | 36.66 | 15.089 |
| 18 | 0.008 | 26.9 | 61.89 | 2.46 | 0.152 |

DAILY TOTAL OF DC ENERGY DELIVERED BY THE ARRAY: 1023.410 KW-HRS

MONTH: OCT
HORIZONTAL LANGLEYS: 396
PANEL LANGLEYS: 525

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 7  | 0.094 | 13.5 | 260.29 | 19.43  | 5.057   |
| 8  | 0.349 | 21.9 | 557.71 | 95.09  | 53.034  |
| 9  | 0.579 | 30.4 | 540.72 | 179.89 | 97.272  |
| 10 | 0.752 | 37.9 | 512.16 | 243.20 | 124.557 |
| 11 | 0.854 | 43.4 | 491.67 | 280.41 | 137.866 |
| 12 | 0.887 | 46.5 | 493.88 | 285.30 | 140.906 |
| 13 | 0.854 | 46.9 | 481.63 | 281.14 | 135.408 |
| 14 | 0.752 | 44.5 | 493.54 | 244.65 | 120.747 |
| 15 | 0.578 | 39.3 | 516.14 | 182.00 | 93.937  |
| 16 | 0.349 | 32.2 | 530.30 | 97.68  | 51.798  |
| 17 | 0.094 | 24.2 | 268.38 | 19.80  | 5.315   |

DAILY TOTAL OF DC ENERGY DELIVERED BY THE ARRAY: 963.707 KW-HRS

MONTH: NOV
HORIZONTAL LANGLEYS: 256
PANEL LANGLEYS: 406

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 7  | 0.004 | 5.4  | 0.00   | 0.00   | 0.000   |
| 8  | 0.234 | 12.7 | 570.24 | 56.59  | 32.273  |
| 9  | 0.448 | 20.5 | 557.29 | 135.67 | 75.606  |
| 10 | 0.607 | 27.3 | 548.06 | 189.64 | 103.935 |
| 11 | 0.703 | 32.6 | 529.49 | 224.84 | 119.051 |
| 12 | 0.735 | 35.5 | 519.81 | 236.70 | 123.039 |
| 13 | 0.703 | 35.8 | 520.24 | 225.62 | 117.378 |
| 14 | 0.607 | 33.5 | 531.08 | 191.16 | 101.519 |
| 15 | 0.447 | 28.6 | 535.20 | 137.75 | 73.726  |
| 16 | 0.234 | 21.9 | 561.73 | 57.50  | 32.299  |
| 17 | 0.004 | 14.6 | 65.11  | 0.29   | 0.019   |

DAILY TOTAL OF DC ENERGY DELIVERED BY THE ARRAY: 778.835 KW-HRS

MONTH: DEC
HORIZONTAL LANGLEYS: 184
PANEL LANGLEYS: 317

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 8  | 0.155 | 6.7  | 395.08 | 39.83  | 15.737  |
| 9  | 0.346 | 13.4 | 579.76 | 97.95  | 56.788  |
| 10 | 0.485 | 19.3 | 559.02 | 148.74 | 83.149  |
| 11 | 0.569 | 23.8 | 559.40 | 175.45 | 98.147  |
| 12 | 0.597 | 26.3 | 551.32 | 185.99 | 102.538 |
| 13 | 0.569 | 26.5 | 551.78 | 176.16 | 97.203  |
| 14 | 0.485 | 24.4 | 560.94 | 145.84 | 81.809  |
| 15 | 0.345 | 20.2 | 561.81 | 99.79  | 56.063  |
| 16 | 0.155 | 14.2 | 458.42 | 38.20  | 17.513  |

DAILY TOTAL OF DC ENERGY DELIVERED BY THE ARRAY: 606.089 KW-HRS

YEARLY TOTAL OF DC ENERGY DELIVERED BY THE ARRAY: 325446.0 KW-HRS

SINGLE AXIS TRACKING AT 50° COMPROMISE SUN ANGLE

LAX
PV SYSTEM PERFORMANCE ESTIMATION PROGRAM
Ver. 3.2   1/31/83

W.R.REED
6/9/83                MONOLITHIC

SYSTEM LOCATION: BAKERSFIELD, CAL.
LATITUDE: 35.42 N

ARRAY SIZE: 32 IN SERIES X 141 IN PARALLEL   M51-39 MODULES

VERTICAL AXIS TRACKING SYSTEM
ARRAY TILT: 50.0 DEGREES

SYSTEM APPLICATION: MAX POWER TRACKING

MONTH: JAN
HORIZONTAL LANGLEYS: 208
PANEL LANGLEYS:      384

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 8  | 0.277 | 9.5  | 592.34 | 73.00  | 43.240  |
| 9  | 0.467 | 16.3 | 567.77 | 141.55 | 80.369  |
| 10 | 0.567 | 21.3 | 566.33 | 173.85 | 98.457  |
| 11 | 0.614 | 24.9 | 554.62 | 191.38 | 106.145 |
| 12 | 0.627 | 27.1 | 548.00 | 196.65 | 107.765 |
| 13 | 0.614 | 27.7 | 545.67 | 192.15 | 105.046 |
| 14 | 0.567 | 26.6 | 551.66 | 175.31 | 96.714  |
| 15 | 0.467 | 23.4 | 548.59 | 143.52 | 78.733  |
| 16 | 0.277 | 17.4 | 571.55 | 75.31  | 43.043  |

DAILY TOTAL OF DC ENERGY DELIVERED BY THE ARRAY:   757.923 KW-HRS

APPENDIX A

MONTH: FEB
HORIZONTAL LANGLEYS: 299
PANEL LANGLEYS:      491

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 7  | 0.102 | 6.5  | 312.77 | 25.93  | 8.112   |
| 8  | 0.431 | 16.4 | 568.83 | 128.90 | 73.322  |
| 9  | 0.596 | 22.8 | 561.03 | 184.63 | 103.580 |
| 10 | 0.680 | 27.5 | 544.81 | 215.31 | 117.303 |
| 11 | 0.714 | 30.7 | 534.31 | 228.16 | 121.909 |
| 12 | 0.723 | 32.7 | 528.16 | 231.62 | 122.334 |
| 13 | 0.714 | 33.6 | 526.15 | 228.91 | 120.438 |
| 14 | 0.680 | 32.9 | 529.55 | 216.73 | 114.769 |
| 15 | 0.596 | 30.2 | 540.67 | 186.61 | 100.892 |
| 16 | 0.431 | 24.8 | 546.01 | 131.25 | 71.661  |
| 17 | 0.102 | 15.2 | 374.73 | 25.83  | 9.680   |

DAILY TOTAL OF DC ENERGY DELIVERED BY THE ARRAY:   958.525 KW-HRS

MONTH: MAR
HORIZONTAL LANGLEYS: 433
PANEL LANGLEYS: 630

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 7 | 0.342 | 15.1 | 575.46 | 97.46 | 56.081 |
| 8 | 0.602 | 23.6 | 558.78 | 186.69 | 104.320 |
| 9 | 0.736 | 29.4 | 537.13 | 235.52 | 126.506 |
| 10 | 0.791 | 33.3 | 523.66 | 255.81 | 133.958 |
| 11 | 0.804 | 35.9 | 515.57 | 260.92 | 134.521 |
| 12 | 0.804 | 37.7 | 510.34 | 261.51 | 133.457 |
| 13 | 0.804 | 38.8 | 507.23 | 261.63 | 132.708 |
| 14 | 0.791 | 38.8 | 507.85 | 257.18 | 130.609 |
| 15 | 0.736 | 37.0 | 515.54 | 237.46 | 122.421 |
| 16 | 0.602 | 32.5 | 533.84 | 189.09 | 100.944 |
| 17 | 0.342 | 24.6 | 550.00 | 100.13 | 55.074 |

DAILY TOTAL OF DC ENERGY DELIVERED BY THE ARRAY: 1226.100 KW-HRS

MONTH: APR
HORIZONTAL LANGLEYS: 568
PANEL LANGLEYS: 738

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 6 | 0.135 | 12.2 | 381.27 | 36.79 | 14.027 |
| 7 | 0.520 | 23.5 | 562.08 | 157.98 | 88.796 |
| 8 | 0.730 | 31.0 | 532.89 | 233.87 | 124.622 |
| 9 | 0.829 | 35.9 | 514.67 | 269.47 | 138.688 |
| 10 | 0.852 | 38.9 | 504.90 | 278.42 | 140.573 |
| 11 | 0.842 | 40.8 | 499.74 | 275.50 | 137.679 |
| 12 | 0.833 | 42.3 | 495.81 | 272.83 | 135.271 |
| 13 | 0.842 | 43.6 | 491.57 | 276.17 | 135.753 |
| 14 | 0.852 | 44.3 | 489.19 | 279.70 | 136.827 |
| 15 | 0.828 | 43.5 | 492.79 | 271.30 | 133.693 |
| 16 | 0.730 | 40.1 | 506.92 | 236.16 | 119.714 |
| 17 | 0.520 | 33.5 | 534.65 | 160.65 | 85.894 |
| 18 | 0.135 | 22.4 | 437.76 | 35.95 | 15.738 |

DAILY TOTAL OF DC ENERGY DELIVERED BY THE ARRAY: 1399.440 KW-HRS

MONTH: MAY
HORIZONTAL LANGLEYS: 681
PANEL LANGLEYS: 837

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 6 | 0.329 | 21.2 | 559.68 | 94.64 | 52.967 |
| 7 | 0.647 | 31.1 | 536.07 | 204.56 | 109.659 |
| 8 | 0.823 | 37.8 | 509.26 | 268.14 | 136.553 |
| 9 | 0.893 | 42.1 | 493.73 | 293.80 | 145.059 |
| 10 | 0.895 | 44.5 | 499.19 | 287.55 | 143.544 |
| 11 | 0.866 | 45.9 | 483.80 | 285.24 | 137.999 |
| 12 | 0.846 | 47.1 | 481.35 | 278.41 | 134.015 |
| 13 | 0.866 | 48.8 | 488.23 | 278.51 | 135.979 |
| 14 | 0.895 | 50.0 | 483.20 | 288.81 | 139.554 |
| 15 | 0.893 | 49.8 | 483.82 | 288.20 | 139.436 |
| 16 | 0.823 | 47.3 | 481.91 | 270.38 | 130.296 |

| | | | | | |
|---|---|---|---|---|---|
| 17 | 0.647 | 41.6 | 506.97 | 207.21 | 104.945 |
| 18 | 0.329 | 32.2 | 530.50 | 97.58 | 51.767 |

DAILY TOTAL OF DC ENERGY DELIVERED BY THE ARRAY:    1558.800 KW-HRS

MONTH: JUN
HORIZONTAL LANGLEYS:   746
PANEL LANGLEYS:        897

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 5 | 0.012 | 15.8 | 62.02 | 2.95 | 0.183 |
| 6 | 0.417 | 27.4 | 539.76 | 127.23 | 68.672 |
| 7 | 0.715 | 36.9 | 516.63 | 230.07 | 118.864 |
| 8 | 0.879 | 43.5 | 490.24 | 289.25 | 141.804 |
| 9 | 0.939 | 47.5 | 488.19 | 303.82 | 148.320 |
| 10 | 0.932 | 49.8 | 481.95 | 301.74 | 145.426 |
| 11 | 0.892 | 51.0 | 480.64 | 288.05 | 138.449 |
| 12 | 0.862 | 51.9 | 479.48 | 277.56 | 133.081 |
| 13 | 0.892 | 53.9 | 472.15 | 288.69 | 136.305 |
| 14 | 0.932 | 55.5 | 465.42 | 302.98 | 141.011 |
| 15 | 0.939 | 55.6 | 464.73 | 305.58 | 142.013 |
| 16 | 0.879 | 53.3 | 474.35 | 284.10 | 134.762 |
| 17 | 0.715 | 48.0 | 485.32 | 232.70 | 112.935 |
| 18 | 0.417 | 39.0 | 508.47 | 130.18 | 66.194 |
| 19 | 0.012 | 27.2 | 60.96 | 3.74 | 0.228 |

DAILY TOTAL OF DC ENERGY DELIVERED BY THE ARRAY:    1628.080 KW-HRS

MONTH: JUL
HORIZONTAL LANGLEYS:   728
PANEL LANGLEYS:        886

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 5 | 0.004 | 19.0 | 53.99 | 0.53 | 0.029 |
| 6 | 0.379 | 29.9 | 534.55 | 114.41 | 61.159 |
| 7 | 0.695 | 40.0 | 508.91 | 223.70 | 113.845 |
| 8 | 0.870 | 46.9 | 480.66 | 286.74 | 137.823 |
| 9 | 0.937 | 51.3 | 477.26 | 303.81 | 144.995 |
| 10 | 0.934 | 53.8 | 470.05 | 303.28 | 142.558 |
| 11 | 0.898 | 55.2 | 467.87 | 291.13 | 136.209 |
| 12 | 0.872 | 56.4 | 465.89 | 282.23 | 131.495 |
| 13 | 0.899 | 58.3 | 459.88 | 291.78 | 133.891 |
| 14 | 0.934 | 59.8 | 452.59 | 304.53 | 137.827 |
| 15 | 0.937 | 59.8 | 452.54 | 305.60 | 138.297 |
| 16 | 0.870 | 57.3 | 463.39 | 281.47 | 130.507 |
| 17 | 0.695 | 51.6 | 475.20 | 226.38 | 107.810 |
| 18 | 0.379 | 42.0 | 502.14 | 117.44 | 58.971 |
| 19 | 0.004 | 31.0 | 51.89 | 1.33 | 0.069 |

DAILY TOTAL OF DC ENERGY DELIVERED BY THE ARRAY:    1575.430 KW-HRS

MONTH: AUG
HORIZONTAL LANGLEYS: 657
PANEL LANGLEYS: 837

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 6 | 0.223 | 24.2 | 555.91 | 58.14 | 32.320 |
| 7 | 0.613 | 36.0 | 523.80 | 193.94 | 101.589 |
| 8 | 0.829 | 44.0 | 491.22 | 271.62 | 133.425 |
| 9 | 0.924 | 49.2 | 484.19 | 298.73 | 144.644 |
| 10 | 0.939 | 52.3 | 474.20 | 304.93 | 144.597 |
| 11 | 0.920 | 54.3 | 469.48 | 298.60 | 140.183 |
| 12 | 0.906 | 55.9 | 465.63 | 293.94 | 136.868 |
| 13 | 0.920 | 57.5 | 460.08 | 299.28 | 137.691 |
| 14 | 0.939 | 58.5 | 456.07 | 306.24 | 139.669 |
| 15 | 0.924 | 57.9 | 458.82 | 300.61 | 137.926 |
| 16 | 0.829 | 54.5 | 473.60 | 266.61 | 126.268 |
| 17 | 0.613 | 47.6 | 491.47 | 196.74 | 96.692 |
| 18 | 0.223 | 36.0 | 524.90 | 61.27 | 32.161 |

DAILY TOTAL OF DC ENERGY DELIVERED BY THE ARRAY:    1493.060 KW-HRS

MONTH: SEP
HORIZONTAL LANGLEYS: 540
PANEL LANGLEYS: 759

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 6 | 0.009 | 15.6 | 62.56 | 2.12 | 0.133 |
| 7 | 0.466 | 28.7 | 534.06 | 144.66 | 77.257 |
| 8 | 0.741 | 38.1 | 512.07 | 239.29 | 122.534 |
| 9 | 0.878 | 44.5 | 487.43 | 288.92 | 140.827 |
| 10 | 0.926 | 48.6 | 485.65 | 299.32 | 145.364 |
| 11 | 0.930 | 51.4 | 477.39 | 301.31 | 143.843 |
| 12 | 0.926 | 53.4 | 471.76 | 300.47 | 141.747 |
| 13 | 0.930 | 54.8 | 467.50 | 302.05 | 141.207 |
| 14 | 0.926 | 55.1 | 466.79 | 300.74 | 140.380 |
| 15 | 0.878 | 53.4 | 474.16 | 283.55 | 134.451 |
| 16 | 0.741 | 48.8 | 481.76 | 241.80 | 116.490 |
| 17 | 0.466 | 40.2 | 518.80 | 143.40 | 74.395 |
| 18 | 0.009 | 27.0 | 61.75 | 2.90 | 0.179 |

DAILY TOTAL OF DC ENERGY DELIVERED BY THE ARRAY:    1372.870 KW-HRS

MONTH: OCT
HORIZONTAL LANGLEYS: 396
PANEL LANGLEYS: 635

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 7 | 0.219 | 16.5 | 560.38 | 56.18 | 31.484 |
| 8 | 0.579 | 27.8 | 547.98 | 179.93 | 98.596 |
| 9 | 0.762 | 35.2 | 519.33 | 246.26 | 127.890 |
| 10 | 0.849 | 40.5 | 500.33 | 278.06 | 139.120 |
| 11 | 0.881 | 44.1 | 488.36 | 289.88 | 141.564 |
| 12 | 0.887 | 46.5 | 493.88 | 285.30 | 140.906 |

| | | | | | |
|---|---|---|---|---|---|
| 13 | 0.881 | 47.6 | 490.96 | 283.29 | 139.085 |
| 14 | 0.849 | 47.1 | 481.34 | 279.58 | 134.574 |
| 15 | 0.762 | 44.2 | 493.82 | 248.42 | 122.678 |
| 16 | 0.579 | 38.2 | 519.23 | 182.61 | 94.816 |
| 17 | 0.219 | 27.4 | 547.68 | 57.59 | 31.542 |

DAILY TOTAL OF DC ENERGY DELIVERED BY THE ARRAY: 1198.940 KW-HRS

MONTH: NOV
HORIZONTAL LANGLEYS: 256
PANEL LANGLEYS: 463

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 7 | 0.004 | 5.4 | 0.00 | 0.00 | 0.000 |
| 8 | 0.360 | 15.9 | 572.76 | 103.81 | 59.458 |
| 9 | 0.565 | 23.5 | 560.36 | 174.00 | 97.501 |
| 10 | 0.673 | 29.1 | 540.60 | 213.21 | 115.260 |
| 11 | 0.722 | 33.0 | 527.36 | 231.38 | 122.020 |
| 12 | 0.735 | 35.5 | 519.81 | 236.70 | 123.039 |
| 13 | 0.722 | 36.3 | 518.06 | 232.21 | 120.298 |
| 14 | 0.673 | 35.2 | 523.39 | 214.79 | 112.417 |
| 15 | 0.565 | 31.7 | 537.78 | 176.19 | 94.753 |
| 16 | 0.360 | 25.1 | 548.09 | 106.39 | 58.309 |
| 17 | 0.004 | 14.6 | 65.11 | 0.31 | 0.020 |

DAILY TOTAL OF DC ENERGY DELIVERED BY THE ARRAY: 903.068 KW-HRS

MONTH: DEC
HORIZONTAL LANGLEYS: 184
PANEL LANGLEYS: 353

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 8 | 0.228 | 8.6 | 580.93 | 56.96 | 33.088 |
| 9 | 0.428 | 15.5 | 571.32 | 127.61 | 72.906 |
| 10 | 0.532 | 20.5 | 569.75 | 161.55 | 92.045 |
| 11 | 0.583 | 24.1 | 557.92 | 180.27 | 100.574 |
| 12 | 0.597 | 26.3 | 551.32 | 185.99 | 102.538 |
| 13 | 0.583 | 26.9 | 550.26 | 181.02 | 99.608 |
| 14 | 0.532 | 25.7 | 555.69 | 162.97 | 90.562 |
| 15 | 0.428 | 22.3 | 553.06 | 129.51 | 71.626 |
| 16 | 0.228 | 16.1 | 561.37 | 59.13 | 33.193 |

DAILY TOTAL OF DC ENERGY DELIVERED BY THE ARRAY: 690.441 KW-HRS

YEARLY TOTAL OF DC ENERGY DELIVERED BY THE ARRAY: 449561.0 KW-HRS

DOUBLE AXIS TRACKING

```
LAX
PV SYSTEM PERFORMANCE ESTIMATION PROGRAM
Ver. 3.2    1/31/83

W.R.REED
6/9/83              MONOLITHIC

SYSTEM LOCATION:  BAKERSFIELD, CAL.
LATITUDE:  35.42 N

ARRAY SIZE:  32 IN SERIES  X  141 IN PARALLEL   M51-39 MODULES

DOUBLE AXIS TRACKING SYSTEM

SYSTEM APPLICATION:  MAX POWER TRACKING

MONTH:  JAN
HORIZONTAL LANGLEYS:   208
PANEL LANGLEYS:        390
```

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 8  | 0.302 | 10.1 | 589.89 | 81.89  | 48.303 |
| 9  | 0.479 | 16.6 | 566.45 | 146.05 | 82.729 |
| 10 | 0.567 | 21.3 | 566.25 | 174.12 | 98.593 |
| 11 | 0.611 | 24.8 | 554.95 | 190.31 | 105.614 |
| 12 | 0.624 | 27.0 | 548.37 | 195.48 | 107.193 |
| 13 | 0.611 | 27.7 | 547.01 | 191.08 | 104.525 |
| 14 | 0.567 | 26.6 | 551.58 | 175.58 | 96.845 |
| 15 | 0.479 | 23.7 | 547.22 | 148.01 | 80.994 |
| 16 | 0.302 | 18.0 | 569.00 | 84.19  | 47.902 |

DAILY TOTAL OF DC ENERGY DELIVERED BY THE ARRAY:    770.925 KW-HRS

APPENDIX A

```
MONTH:  FEB
HORIZONTAL LANGLEYS:   299
PANEL LANGLEYS:        496
```

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 7  | 0.114 | 6.8  | 395.87 | 28.05  | 11.106 |
| 8  | 0.452 | 16.9 | 566.63 | 136.44 | 77.308 |
| 9  | 0.599 | 22.9 | 560.73 | 185.59 | 104.066 |
| 10 | 0.677 | 27.4 | 545.21 | 214.05 | 116.703 |
| 11 | 0.714 | 30.7 | 534.33 | 228.09 | 121.873 |
| 12 | 0.725 | 32.8 | 527.87 | 232.51 | 122.735 |
| 13 | 0.714 | 33.6 | 526.17 | 228.83 | 120.403 |
| 14 | 0.677 | 32.8 | 529.96 | 215.47 | 114.192 |

| | | | | | |
|---|---|---|---|---|---|
| 15 | 0.599 | 30.2 | 540.36 | 187.57 | 101.355 |
| 16 | 0.452 | 25.4 | 543.71 | 138.77 | 75.452 |
| 17 | 0.114 | 15.5 | 373.55 | 30.03 | 11.216 |

DAILY TOTAL OF DC ENERGY DELIVERED BY THE ARRAY: 969.541 KW-HRS

MONTH: MAR
HORIZONTAL LANGLEYS: 433
PANEL LANGLEYS: 643

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 7  | 0.370 | 15.8 | 572.62 | 107.34 | 61.464 |
| 8  | 0.610 | 23.8 | 557.89 | 189.56 | 105.754 |
| 9  | 0.733 | 29.3 | 537.55 | 234.21 | 125.901 |
| 10 | 0.797 | 33.4 | 523.01 | 257.77 | 134.819 |
| 11 | 0.826 | 36.5 | 512.85 | 269.03 | 137.972 |
| 12 | 0.835 | 38.6 | 506.58 | 272.61 | 138.099 |
| 13 | 0.826 | 39.4 | 504.48 | 269.74 | 136.079 |
| 14 | 0.797 | 39.0 | 507.18 | 259.15 | 131.434 |
| 15 | 0.733 | 36.9 | 515.98 | 236.15 | 121.849 |
| 16 | 0.610 | 32.8 | 532.92 | 191.95 | 102.295 |
| 17 | 0.370 | 25.4 | 547.03 | 110.00 | 60.175 |

DAILY TOTAL OF DC ENERGY DELIVERED BY THE ARRAY: 1250.910 KW-HRS

MONTH: APR
HORIZONTAL LANGLEYS: 568
PANEL LANGLEYS: 767

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 6  | 0.148 | 12.6 | 462.66 | 38.11  | 17.633 |
| 7  | 0.538 | 24.0 | 560.11 | 164.45 | 92.107 |
| 8  | 0.728 | 30.9 | 533.12 | 233.12 | 124.282 |
| 9  | 0.831 | 35.9 | 514.35 | 270.44 | 139.099 |
| 10 | 0.883 | 39.7 | 501.01 | 289.78 | 145.184 |
| 11 | 0.909 | 42.6 | 504.09 | 292.09 | 147.241 |
| 12 | 0.918 | 44.6 | 497.99 | 295.51 | 147.161 |
| 13 | 0.909 | 45.4 | 495.84 | 292.76 | 145.161 |
| 14 | 0.883 | 45.2 | 497.89 | 283.67 | 141.235 |
| 15 | 0.831 | 43.5 | 492.45 | 272.27 | 134.079 |
| 16 | 0.728 | 40.1 | 507.17 | 235.42 | 119.396 |
| 17 | 0.538 | 34.0 | 532.58 | 167.11 | 89.001 |
| 18 | 0.148 | 22.7 | 436.41 | 40.59  | 17.713 |

DAILY TOTAL OF DC ENERGY DELIVERED BY THE ARRAY: 1449.990 KW-HRS

MONTH: MAY
HORIZONTAL LANGLEYS: 681
PANEL LANGLEYS: 888

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 6 | 0.355 | 21.8 | 557.00 | 103.74 | 57.780 |
| 7 | 0.656 | 31.3 | 535.03 | 207.80 | 111.178 |

| | | | | | |
|---|---|---|---|---|---|
| 8 | 0.819 | 37.7 | 509.71 | 266.80 | 135.990 |
| 9 | 0.908 | 42.5 | 504.53 | 291.74 | 147.190 |
| 10 | 0.955 | 46.1 | 491.65 | 308.92 | 151.882 |
| 11 | 0.981 | 49.0 | 481.94 | 318.70 | 153.595 |
| 12 | 0.991 | 51.0 | 475.55 | 322.66 | 153.442 |
| 13 | 0.981 | 51.8 | 473.52 | 319.33 | 151.210 |
| 14 | 0.955 | 51.6 | 475.49 | 310.16 | 147.477 |
| 15 | 0.908 | 50.2 | 481.90 | 293.53 | 141.453 |
| 16 | 0.819 | 47.2 | 482.38 | 269.03 | 129.776 |
| 17 | 0.606 | 41.9 | 505.39 | 210.44 | 106.352 |
| 18 | 0.355 | 32.8 | 527.87 | 106.66 | 56.283 |

DAILY TOTAL OF DC ENERGY DELIVERED BY THE ARRAY: 1640.150 KW-HRS

MONTH: JUN
HORIZONTAL LANGLEYS:   46
PANEL LANGLEYS:        959

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 5 | 0.008 | 15.7 | 62.35 | 1.75 | 0.109 |
| 6 | 0.444 | 28.0 | 536.83 | 136.72 | 73.398 |
| 7 | 0.721 | 37.1 | 515.93 | 232.20 | 119.798 |
| 8 | 0.876 | 43.4 | 490.61 | 288.21 | 141.397 |
| 9 | 0.961 | 48.1 | 485.39 | 311.64 | 151.267 |
| 10 | 1.007 | 51.8 | 472.28 | 328.39 | 155.092 |
| 11 | 1.034 | 54.7 | 462.14 | 338.59 | 156.475 |
| 12 | 1.045 | 56.8 | 455.38 | 343.04 | 156.216 |
| 13 | 1.034 | 57.7 | 453.43 | 339.20 | 153.804 |
| 14 | 1.007 | 57.5 | 455.52 | 329.59 | 150.139 |
| 15 | 0.961 | 56.2 | 461.84 | 313.39 | 144.737 |
| 16 | 0.876 | 53.3 | 474.73 | 283.06 | 134.375 |
| 17 | 0.721 | 48.1 | 484.58 | 234.82 | 113.790 |
| 18 | 0.444 | 39.7 | 521.33 | 135.51 | 70.646 |
| 19 | 0.008 | 27.2 | 61.32 | 2.54 | 0.156 |

DAILY TOTAL OF DC ENERGY DELIVERED BY THE ARRAY: 1721.290 KW-HRS

MONTH: JUL
HORIZONTAL LANGLEYS:   728
PANEL LANGLEYS:        944

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 5 | 0.002 | 19.0 | 54.13 | 0.03 | 0.002 |
| 6 | 0.406 | 30.6 | 531.57 | 123.99 | 65.910 |
| 7 | 0.703 | 40.2 | 507.96 | 226.55 | 115.078 |
| 8 | 0.867 | 46.9 | 481.09 | 285.54 | 137.371 |
| 9 | 0.956 | 51.8 | 474.83 | 310.49 | 147.429 |
| 10 | 1.003 | 55.7 | 460.99 | 327.81 | 151.120 |
| 11 | 1.030 | 58.8 | 450.42 | 337.98 | 152.233 |
| 12 | 1.041 | 60.9 | 443.40 | 342.24 | 151.749 |
| 13 | 1.030 | 61.9 | 441.22 | 338.60 | 149.397 |
| 14 | 1.003 | 61.7 | 443.32 | 329.03 | 145.865 |
| 15 | 0.956 | 60.3 | 450.04 | 312.26 | 140.529 |
| 16 | 0.867 | 57.2 | 463.83 | 280.45 | 130.079 |
| 17 | 0.703 | 51.8 | 475.22 | 229.23 | 108.933 |
| 18 | 0.406 | 42.7 | 499.00 | 127.00 | 63.372 |
| 19 | 0.002 | 30.9 | 23.97 | 1.20 | 0.029 |

DAILY TOTAL OF DC ENERGY DELIVERED BY THE ARRAY: 1659.080 KW-HRS

MONTH: AUG
HORIZONTAL LANGLEYS: 657
PANEL LANGLEYS: 877

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 6  | 0.244 | 24.7 | 553.63 | 65.87  | 36.468  |
| 7  | 0.630 | 36.4 | 521.79 | 200.09 | 104.404 |
| 8  | 0.826 | 43.9 | 491.55 | 270.67 | 133.049 |
| 9  | 0.931 | 49.4 | 485.26 | 301.33 | 145.620 |
| 10 | 0.985 | 53.5 | 468.31 | 321.01 | 150.332 |
| 11 | 1.012 | 56.7 | 457.39 | 331.24 | 151.505 |
| 12 | 1.021 | 59.0 | 450.32 | 334.99 | 150.851 |
| 13 | 1.012 | 60.0 | 447.84 | 331.90 | 148.637 |
| 14 | 0.985 | 59.7 | 450.04 | 322.30 | 145.049 |
| 15 | 0.931 | 58.1 | 457.86 | 303.20 | 138.822 |
| 16 | 0.826 | 54.5 | 473.94 | 265.67 | 125.912 |
| 17 | 0.630 | 48.1 | 489.35 | 202.87 | 99.276  |
| 18 | 0.244 | 36.6 | 522.48 | 68.99  | 36.045  |

DAILY TOTAL OF DC ENERGY DELIVERED BY THE ARRAY: 1553.630 KW-HRS

MONTH: SEP
HORIZONTAL LANGLEYS: 540
PANEL LANGLEYS: 778

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 6  | 0.007 | 15.5 | 62.82  | 1.18   | 0.074   |
| 7  | 0.497 | 29.5 | 546.49 | 151.58 | 82.834  |
| 8  | 0.747 | 38.3 | 511.34 | 241.47 | 123.474 |
| 9  | 0.875 | 44.4 | 487.75 | 288.01 | 140.475 |
| 10 | 0.940 | 49.0 | 483.77 | 304.56 | 147.337 |
| 11 | 0.971 | 52.5 | 472.06 | 315.93 | 149.140 |
| 12 | 0.980 | 54.8 | 464.72 | 319.61 | 148.529 |
| 13 | 0.971 | 55.9 | 462.10 | 316.66 | 146.328 |
| 14 | 0.940 | 55.5 | 464.86 | 305.97 | 142.233 |
| 15 | 0.875 | 53.4 | 474.49 | 282.65 | 134.113 |
| 16 | 0.747 | 49.0 | 481.00 | 243.98 | 117.352 |
| 17 | 0.497 | 41.0 | 515.15 | 154.50 | 79.593  |
| 18 | 0.007 | 28.9 | 62.03  | 1.96   | 0.122   |

DAILY TOTAL OF DC ENERGY DELIVERED BY THE ARRAY: 1411.520 KW-HRS

MONTH: OCT
HORIZONTAL LANGLEYS: 396
PANEL LANGLEYS: 644

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 7  | 0.245 | 17.2 | 573.14 | 64.13  | 36.755  |
| 8  | 0.602 | 28.4 | 545.37 | 188.21 | 102.643 |
| 9  | 0.764 | 35.3 | 519.16 | 246.77 | 128.113 |
| 10 | 0.847 | 40.4 | 500.60 | 277.26 | 138.796 |
| 11 | 0.886 | 44.3 | 500.33 | 284.49 | 142.338 |
| 12 | 0.898 | 46.8 | 492.55 | 289.05 | 142.375 |
| 13 | 0.886 | 47.7 | 490.25 | 285.29 | 139.865 |
| 14 | 0.847 | 47.0 | 481.62 | 278.79 | 134.268 |
| 15 | 0.764 | 44.2 | 493.65 | 248.93 | 122.886 |

| | | | | | |
|---|---|---|---|---|---|
| 16 | 0.602 | 38.8 | 516.51 | 190.87 | 98.587 |
| 17 | 0.245 | 28.1 | 544.82 | 67.12 | 36.568 |

DAILY TOTAL OF DC ENERGY DELIVERED BY THE ARRAY: 1207.710 KW-HRS

MONTH: NOV
HORIZONTAL LANGLEYS: 256
PANEL LANGLEYS: 469

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 7 | 0.003 | 5.3 | 0.00 | 0.00 | 0.000 |
| 8 | 0.389 | 16.6 | 569.70 | 114.40 | 65.176 |
| 9 | 0.578 | 23.8 | 558.96 | 178.57 | 99.812 |
| 10 | 0.673 | 29.1 | 540.61 | 213.18 | 115.249 |
| 11 | 0.719 | 33.0 | 527.71 | 230.29 | 121.529 |
| 12 | 0.732 | 35.4 | 520.14 | 235.70 | 122.579 |
| 13 | 0.719 | 36.2 | 518.42 | 231.12 | 119.819 |
| 14 | 0.673 | 35.2 | 523.39 | 214.77 | 112.407 |
| 15 | 0.578 | 32.0 | 536.32 | 180.76 | 96.945 |
| 16 | 0.389 | 25.9 | 544.89 | 115.97 | 63.733 |
| 17 | 0.003 | 14.6 | 0.00 | 0.00 | 0.000 |

DAILY TOTAL OF DC ENERGY DELIVERED BY THE ARRAY: 917.269 KW-HRS

MONTH: DEC
HORIZONTAL LANGLEYS: 184
PANEL LANGLEYS: 359

| SOLAR HOUR | PANEL KW/SQM | CELL TEMP (C) | SYSTEM VOLTAGE | SYSTEM AMPERES | SYSTEM POWER (KW) |
|---|---|---|---|---|---|
| 8 | 0.251 | 9.1 | 594.08 | 63.77 | 37.883 |
| 9 | 0.443 | 15.9 | 569.67 | 133.28 | 75.928 |
| 10 | 0.536 | 20.6 | 569.38 | 162.81 | 92.700 |
| 11 | 0.581 | 24.1 | 558.11 | 179.67 | 100.274 |
| 12 | 0.595 | 26.2 | 551.62 | 185.04 | 102.072 |
| 13 | 0.581 | 26.9 | 550.45 | 180.42 | 99.313 |
| 14 | 0.536 | 25.7 | 555.30 | 164.23 | 91.197 |
| 15 | 0.443 | 22.7 | 551.36 | 135.18 | 74.531 |
| 16 | 0.251 | 16.7 | 574.45 | 65.97 | 37.896 |

DAILY TOTAL OF DC ENERGY DELIVERED BY THE ARRAY: 705.278 KW-HRS

YEARLY TOTAL OF DC ENERGY DELIVERED BY THE ARRAY: 464809.0 KW-HRS

What is claimed is:

1. A solar generator structure comprising:
   a domeshaped support segment having a plurality of stepped, flat, upwardly facing surfaces mounting solar cell panels thereon; and
   means for rotating said support segment about a vertical axis at the dome's apex so that said solar panels follow the sun's movements.

2. A structure in accordance with claim 1 wherein the stepped surfaces are fixed at a predetermined angular amount.

3. A structure in accordance with claim 2 wherein the predetermined amount is a compromise sun angle selected to catch a high amount of the sun's rays for the particular location of the support structure.

4. A structure in accordance with claim 1 comprising a series of parallel trusses starting at the support segment's base and curving upward toward the support segment's apex.

5. A structure in accordance with claim 4 wherein the trusses define flat parallel planes having areas diminishing in two directions to conform to the support segment's dome shape, and means for rotating the parallel planes in a second axis to further follow the sun's movement.

6. A solar generator structure comprising:
   a substantially dome-shaped inner support means;
   an outer, substantially dome-shaped segment spaced from and rotatable about the inner support means, said segment comprising;
   a plurality of planes mounting photovoltaic arrays thereon which are oriented to generally face the sun during a majority of daylight hours.

7. A solar generator in accordance with claim 6 and wherein said outer segment further comprises:
   a substantially hemidome configuration having a main central flat, faceted and stepped portion starting at the base and extending over the apex of the hemidome; and
   stepped flat bays symmetrically located on both sides of the central portion towards the edges of a diameter located at the base of the hemidome.

8. A solar generator in accordance with claim 7 and further comprising:
   means for rotating the outer hemidome to follow the sun's movement.

9. A solar generator in accordance with claim 8 and further comprising:
   a first plurality of wheels at the base of the outer hemidome and means for driving the wheels at the rate of the sun's movement.

10. A solar generator in accordance with claim 9 and further comprising:
   means for driving the outer hemidome at a faster rate to a position for minimizing the chance of damage by strong winds.

11. A solar generator in accordance with claim 9 and further comprising:
   a second plurality of wheels and a track supported on the inner dome at a position intermediate of the base and the apex of the inner dome, and
   a pivot point bearing located at the apex of the inner dome for supporting a portion of the load of the outer hemidome.

12. A solar generator in accordance with claim 11 and further comprising:
   locking wheels associated with said second plurality of wheels for securing the hemidome to said intermediate rail while permitting rotation thereof.

13. A solar generator in accordance with claim 8 wherein said rotating means comprises:
   a plurality of parallel circular rails concentrically positioned and supported by said dome-shaped inner support, and
   wheeled support mechanisms positioned between said outer hemidome and said rails with the wheels adapted for riding upon said rails.

14. A solar generator in accordance with claim 13 and further comprising:
   means for driving selected ones of said wheeled support mechanisms at the rate of the sun's movement.

15. A solar generator in accordance with claim 14 wherein said means for driving further comprises:
   a motor and a gear drive system driven thereby;
   a drive axle having worm gears located at the extremities of said drive axle, and
   mating gear means meshing with said worm gears and connected to said wheels for driving said wheels along said rails.

16. A solar generator in accordance with claim 15 wherein said selected ones of said wheeled support mechanisms are located on the rail nearest to the base of said outer hemidome.

17. A solar generator in accordance with claim 7 and further comprising:
   an upwardly extending series of terminating upper courses at the upper extremity of each bay of the hemidome located beyond the apex and extending therefrom towards the edges of said hemidome diameter.

18. A solar generator in accordance with claim 17 and further comprising:
   planes of said flat bays and courses positioned to face upwardly at a compromise sun angle selected for the particular solar collection location.

19. A solar generator in accordance with claim 17 and said terminating courses further comprising:
   upwardly standing flat planes for collecting more solar rays than the diminished area of that last course would have been able to collect had it followed the dome segment's geometry as herein defined.

20. A solar generator in accordance with claim 7 and further comprising:
   a first main course adjacent to said base and wherein said course is defined by a plurality of planes tangentially spaced from the outer surface of the inner dome, and said course comprising in total a majority of the aperture area for the sun's solar rays, and each plane within that course being symmetrically located from the center and diminishing in area as the planes are located away from the center and toward the outer edge of the hemidome.

21. A solar generator in accordance with claim 20 and further comprising:
   a plurality of additional courses located above said first course and each one of said plurality of courses having planes similarly configured to that defined for said first course and further defined by each course presenting diminishing areas as it is progressively located toward and over the apex of the hemidome.

22. A solar generator in accordance with claim 6 wherein:
   said dome-shaped inner support means is a thin-walled dome providing useable space therein.

23. A solar generator in accordance with claim 6 wherein the plurality of planes comprise a first group located near the base of the segment and facing the sun at a compromise sun angle related to the latitude where the solar generator is located.

24. A solar generator in accordance with claim 23 wherein the plurality of planes additionally comprise a second stepped group located above and behind the first group and also facing said compromise sun angle.

25. A solar generator in accordance with claim 24 wherein the steps of the second group are at right angles between adjacent array planes.

26. A solar generator in accordance with claim 25 wherein the steps of said second group are progressively situated above and behind adjacent array planes.

27. A solar generator in accordance with claim 26 wherein the steps cause shading on the next upper array plane at low sun angles.

28. A solar generator in accordance with claim 27 wherein the steps are defined by an angle less than said right angle for minimizing said shading by an amount related to said angular difference.

29. A solar generator in accordance with claim 28 wherein the angular difference is about 10°, which amount maximizes the total array plane area unaffected by shading.

30. A solar generator in accordance with claim 29 wherein the angular difference provides sun rays on the array planes earlier than was the case with said right angle steps.

31. A solar generator in accordance with claim 23 wherein said plurality of planes additionally comprise:
   a second group of planes faceted towards the sides of said dome-shaped segment and tilted at a predetermined angle less than said compromise sun angle.

32. A solar generator in accordance with claim 31 and additionally comprising:
a third group of planes faceted towards the sides of said dome-shaped segment and essentially horizontally positioned over the apex of said inner dome.

33. A solar generator in accordance with claim 32 and further comprising:
a fourth group of planes faceted towards the sides of said dome, with said fourth group positioned above said third group and facing at said compromise sun angle.

34. A solar generator in accordance with claim 31 wherein said plurality of planes additionally comprise:
a third group of planes tilted at a predetermined angle less than said angle of said second group.

35. A solar generator in accordance with claim 34 wherein said first group faces the compromise sun angle and are tilted with respect to the plane of the dome's base at about 50°, the second group is tilted with respect to said base at an angle of about 30°, and said third group is tilted with respect to said base at an angle of about 20°.

36. A solar generator in accordance with claim 6 wherein said plurality of planes on said outer substantially dome-shaped segment are flat, rectangular and parallel with each other.

37. A solar generator in accordance with claim 6 wherein the plurality of planes additionally comprise a plurality of ramp planes located above and continuous from the top of said first group and continuous from the top of each progressively higher ramp plane.

38. A method of forming a solar energy support structure comprising the steps of:
establishing a dome-shaped inner surface;
spacing a segment of an outer dome away from and coaxial with the inner dome;
facing a plurality of planes on the outer surface of the outer dome segment in a configuration when viewed from a compromise sun angle such that the unshadowed portions of the planes form essentially an ellipse.

39. A method in accordance with claim 38 and further comprising the step of:
arranging a series of parallel trusses for the planes so that the bottom surface of one truss is available as the top surface of an adjacent truss.

* * * * *

UNITED STATES PATENT AND TRADEMARK OFFICE
CERTIFICATE OF CORRECTION

PATENT NO. : 4,594,470
DATED : June 10, 1986
INVENTOR(S) : Richard T. Headrick

It is certified that error appears in the above—identified patent and that said Letters Patent is hereby corrected as shown below:

Column 5, line 31, before "solar" "flow" should read --flat--.

Column 13, line 4, before "66" insert --only--.

Column 14, line 25, "baked on" should read --baked-on--.

Column 17, line 45, "when" should read --then--.

Column 12, line 64, delete "only".

Signed and Sealed this

Fourth Day of October, 1988

Attest:

DONALD J. QUIGG

Attesting Officer

Commissioner of Patents and Trademarks